(12) United States Patent
Lörcher et al.

(10) Patent No.: US 11,289,977 B2
(45) Date of Patent: Mar. 29, 2022

(54) COOLING DEVICE FOR AN ELECTRIC MOTOR AND ELECTRIC MOTOR WITH COOLING DEVICE

(71) Applicant: Ziehl-Abegg SE, Künzelsau (DE)

(72) Inventors: Frieder Lörcher, Braunsbach (DE); Lothar Ernemann, Heilbronn (DE)

(73) Assignee: Ziehl-Abegg SE, Künzelsau (DE)

( * ) Notice: Subject to any disclaimer, the term of this patent is extended or adjusted under 35 U.S.C. 154(b) by 111 days.

(21) Appl. No.: 16/471,059

(22) PCT Filed: Dec. 11, 2017

(86) PCT No.: PCT/EP2017/001415
§ 371 (c)(1),
(2) Date: Jun. 19, 2019

(87) PCT Pub. No.: WO2018/114037
PCT Pub. Date: Jun. 28, 2018

(65) Prior Publication Data
US 2020/0021167 A1     Jan. 16, 2020

(30) Foreign Application Priority Data
Dec. 19, 2016  (DE) ..................... 10 2016 015 535.3

(51) Int. Cl.
*H02K 9/04* (2006.01)
*H02K 5/18* (2006.01)
*F28F 3/02* (2006.01)

(52) U.S. Cl.
CPC .............. *H02K 9/04* (2013.01); *F28F 3/025* (2013.01); *H02K 5/18* (2013.01)

(58) Field of Classification Search
CPC .... F28F 3/046; F28F 3/02; F28F 3/025; F28F 3/027; F28F 3/048; F28F 15/04;
(Continued)

(56) References Cited

U.S. PATENT DOCUMENTS

| | | | | |
|---|---|---|---|---|
| 649,574 | A | * | 5/1900 | Foshag .................... H02K 1/20 310/65 |
| 5,314,738 | A | * | 5/1994 | Ichikawa .................. B32B 3/28 428/182 |

(Continued)

FOREIGN PATENT DOCUMENTS

| | | | | |
|---|---|---|---|---|
| CN | 2119632 U | * | 10/1992 | ............... F28D 1/03 |
| CN | 204 391 932 | | 6/2015 | |

(Continued)

OTHER PUBLICATIONS

J.Zhang et al. "Effect of fin waviness and spacing on the lateral vortex structure and laminar heat transfer in wavy-plate-fin cores" Int'l Journal of Heat and Mass Transfer 47 (2004) 1719-1730. (Year: 2004).*

(Continued)

*Primary Examiner* — Burton S Mullins
(74) *Attorney, Agent, or Firm* — Gudrun E. Huckett

(57) ABSTRACT

The cooling device is intended for an electric motor and has a rotor cooling flange and a stator cooling flange (2), of which one is rotatable with respect to the other. At least one of the two cooling flanges (2) is provided with cooling ribs (8) arranged distributed over its circumference. During operation of the electric motor, at least one of the two cooling flanges gives off heat to the surrounding air. At least some of the cooling ribs (8) of a heat-emitting cooling flange (2) have an undulating profile over their length. In this context, the surface area of a cooling rib (8) having an undulating profile is larger than the surface area of the associated straight reference rib.

32 Claims, 15 Drawing Sheets

(58) Field of Classification Search
CPC .. H02K 9/04; H02K 5/18; H02K 9/08; H02K 9/06; H02K 2209/00; H02K 2213/03; F05D 2250/184
See application file for complete search history.

(56) References Cited

U.S. PATENT DOCUMENTS

| | | | | |
|---|---|---|---|---|
| 6,498,408 | B2* | 12/2002 | Tong | H02K 1/20 |
| | | | | 310/60 A |
| 6,809,443 | B2* | 10/2004 | Nakamura | H02K 11/046 |
| | | | | 310/64 |
| 7,117,928 | B2* | 10/2006 | Chen | H01L 23/3672 |
| | | | | 165/80.3 |
| 7,614,443 | B2* | 11/2009 | Usui | F28D 7/1684 |
| | | | | 165/177 |
| 8,531,065 | B2* | 9/2013 | Knorr | H02K 5/18 |
| | | | | 310/58 |
| 8,810,086 | B2* | 8/2014 | Best | H02K 5/10 |
| | | | | 310/64 |
| 9,945,619 | B2* | 4/2018 | Cho | F28F 13/06 |
| 10,033,242 | B2* | 7/2018 | Cocks | H02K 11/33 |
| 10,072,893 | B2* | 9/2018 | Prieels | F28F 9/0263 |
| 10,406,601 | B2* | 9/2019 | Martin | B22F 7/02 |
| 2006/0289152 | A1* | 12/2006 | Leuschner | F28F 1/126 |
| | | | | 165/152 |
| 2014/0290921 | A1* | 10/2014 | Ito | F28D 9/005 |
| | | | | 165/166 |
| 2018/0123428 | A1* | 5/2018 | Sturm | H02K 9/08 |

FOREIGN PATENT DOCUMENTS

| | | | |
|---|---|---|---|
| DE | 1 005 172 | 3/1957 | |
| DE | 20 2015 105 804 | 1/2016 | |
| DE | 102016211463 A1 * | 12/2017 | H02K 11/30 |
| WO | 2013/136021 | 9/2013 | |

OTHER PUBLICATIONS

K.Vajravelu et al. "Fluid Flow and Heat Transfer in Horizontal Wavy Channels" Acta Mechanica 35, 245-258 (1980). (Year: 1980).*

M.Asadi et al. "Study on Heat Transfer Area of a Plate-Fin Heat Exchanger with Wavy Surfaces" IJTE vol. 1, Issue 1, 2013, pp. 15-29. (Year: 2013).*

* cited by examiner

COOLING DEVICE FOR AN ELECTRIC MOTOR AND ELECTRIC MOTOR WITH COOLING DEVICE

BACKGROUND OF THE INVENTION

The invention concerns a cooling device of an electric motor with a rotor cooling flange and a stator cooling flange, of which one is rotatable relative to the other and at least one of the two cooling flanges is provided with cooling ribs that are distributed about its circumference, as well as an electric motor provided with such a cooling device.

Electric motors have a stator and a rotor. In case of an external rotor motor, the rotor surrounds the stator. In the stator and/or in the rotor, there are components which produce heat in operation of the electric motor. In order to remove it, the stator and the rotor have cooling flanges in the form of a stator cooling flange or a rotor cooling flange on which cooling ribs may be arranged, respectively. Stator cooling flange and rotor cooling flange taken together are referred to as cooling device. The cooling flanges are positioned with minimal spacing opposite each other. When in operation of the electric motor the rotor and thus the rotor cooling flange rotate about their axis, a cooling air flow is produced which flows between the two cooling flanges as well as the cooling ribs located thereon and dissipates the heat absorbed by the cooling device. The cooling ribs are arranged distributed about the circumference and are embodied straight. In general, the cooling ribs extend in radial direction but can also be arranged at a slant to the radial direction.

In a cooling device, cooling flanges with cooling ribs can have in particular two functions. On the one hand, a cooling flange can serve directly for dissipation of heat (heat-dissipating cooling flange) which is introduced at a different location into the corresponding heat-dissipating cooling flange. On the other hand, a cooling flange can have an aerodynamic function. In operation of the motor, a cooling flange with aerodynamic function serves to influence the air flow conditions in the cooling system, advantageously in interaction with the oppositely positioned cooling flange, in such a way that the heat dissipation of the cooling system is affected decisively in an advantageous way. A cooling flange can have heat-dissipating function as well as aerodynamic function at the same time. On the other hand, a cooling flange can also have only aerodynamic or only heat-dissipating function.

For a given maximum installation space, the cooling system can dissipate only a limited quantity of heat. Moreover, when the motor is running, the cooling ribs lead to increased noise development, a so-called rotation sound, that is often perceived as disruptive. In particular when on the stator cooling flange as well as on the rotor cooling flange respective oppositely positioned cooling ribs are straight in their extension and do not have an angle or only a minimal angle relative to each other as, for example, when all cooling ribs have a purely radial extension, oppositely positioned cooling ribs of the stator cooling flange and rotor cooling flange pass each other simultaneously across a large radial length upon rotational movement of the rotor. This leads to the generation of increased rotation sounds.

The invention has the object to configure the cooling device of the aforementioned kind and the electric motor in such a way that the cooling performance is increased, without claiming more installation space, and the noise development is reduced.

SUMMARY OF THE INVENTION

This object is solved for the cooling device of the aforementioned kind in accordance with the invention in that at least one of the two cooling flanges dissipates heat to the ambient air in operation of the electric motor and at least some of the cooling ribs of a heat-dissipating cooling flange across their length have an undulating course, wherein the surface of a cooling rib with undulating course is greater than the surface of the associated straight reference rib. and for the electric motor in that it is provided with the cooling device of the invention.

In the cooling device according to the invention, at least some of the cooling ribs no longer extend straight but are designed in an undulating shape deviating from a straight line. This leads in heat-dissipating cooling flanges to enlargement of the available surface of the cooling rib so that the heat dissipation can be significantly increased. In comparison to a straight reference cooling rib which has an extension which is comparable to that of the undulating cooling rib, in particular the same radial and axial extension as well as same thickness, the undulating cooling rib has a larger heat-dissipating surface. The non-straight extension of the cooling ribs requires no additional installation space so that the cooling device and thus also the entire electric motor can still be embodied to have a compact configuration. In addition, the shape of the cooling ribs which deviates from a straight extension, also achieves that the rotation sound upon rotation of the rotor cooling flange is now only minimal. This is achieved in that, upon rotation movement of the rotor, the oppositely positioned cooling ribs of the stator cooling flange and of the rotor cooling flange no longer pass each other simultaneously across a large radial extension, in particular because between oppositely positioned cooling ribs across a large region, advantageously >50%, of the common radial extension, an angle of significantly greater than 0°, advantageously >5°, exists at the moment of passing each other. Moreover, this angle between the cooling ribs is variable across the radial extension.

In this way, simply by shaping the cooling ribs, it can be achieved in an advantageous way that not only the cooling performance is increased by corresponding enlargement of the cooling rib surface but at the same time also the noise development is minimized while the compact installation space is maintained.

The undulation leads to a particularly large surface enlargement of the cooling ribs with predefined radial extension of the cooling flange. In use of the electric motor, the undulation generates high turbulence levels so that the heat dissipation via the cooling air is favorably affected. The undulation is provided in that the cooling rib over the course of its cooling rib center line, viewed in a planar projection, relative to a straight reference line, has significant deflections alternatingly in positive and negative circumferential direction. The deviation (difference) in the course of the cooling ribs relative to their respective straight reference line, as a function of the corresponding position on the straight reference line, is defined as undulation function, also viewed in a planar projection. Advantageously, this undulation function for a large part of the cooling ribs on a cooling flange, advantageously at least 80% of the cooling ribs, has at least two local extremes. The straight reference line of a cooling rib can be positioned in radial direction of the cooling flange or at an angle relative to the radial direction.

By adjusting the phase position for at least one pair of, preferably for the largest part of, in particular for all of the neighboring undulating cooling ribs, the cooling performance can be made independent of the rotational direction of the rotating cooling flange in a very advantageous way.

An undulating configuration is to be understood not only as a pure undulation but, for example, also as a sawtooth-shaped course.

The undulation functions have amplitudes, wavelengths, and phase positions. The amplitudes and wavelengths can be variable across the extension of a cooling rib. The phase position is determined relative to an envelope circle which characterizes the radial inner end of the cooling flange.

Advantageously, the ratio of the wavelength of the undulating cooling ribs relative to the radial extension of the associated cooling flange is between 0.7 and 1.7. Due to this configuration, an optimal large surface of the cooling ribs for a predefined radial width of the holding part on which these cooling ribs are located is provided, wherein the flow channels between the cooling ribs can still be embodied to have beneficial flow properties.

Advantageously, the amplitude of the undulating cooling ribs of a cooling flange is in the range of approximately 0.1 times to approximately 0.3 times the averaged cooling rib wavelength of the same respective cooling rib.

The amplitude of the undulating cooling ribs can preferably vary across the circumference. In this way, a further adjustment parameter is made available in order to maximize the cooling performance.

The average spacing between the cooling ribs amounts to approximately two times to six times the average thickness of a cooling rib, which contributes advantageously to a compact configuration. In this way, the spacing between the cooling ribs, despite the compact configuration, is sufficiently large so that the cooling air flow which flows between the cooling ribs can flow across the surface of the cooling system.

Advantageously, the spacing between the cooling ribs corresponds to at least twice an average thickness of the cooling ribs. This spacing, depending on the size of the electric motor, can be between approximately 1.5 mm and approximately 18 mm.

The thickness of the cooling ribs advantageously amounts to only between approximately 1.5 to approximately 3 mm, which contributes to a compact configuration and good manufacturability by a pressure die casting method.

The cooling ribs can have a constant thickness across their height, but also a decreasing thickness in the direction toward their end face. Such a configuration enables a simple removal from the mold in the pressure die casting method for producing the cooling flanges.

The cooling ribs are advantageously provided on the cooling flange such that their two ends are positioned in the region of an inner and an outer envelope circle wherein both envelope circles are positioned coaxial relative to each other.

In order to obtain an expansion of the cooling flanges in radial direction that is not too large, advantageously the ratio of the outer envelope circle to the inner envelope circle is between approximately 1.1 to approximately 1.6. In this way, a cooling flange does not present an obstacle for the air flow, in particular when the electric motor is used for an axial fan.

In order to obtain the cooling performance independent of the rotational direction of the rotating cooling flange, it is advantageously provided that the phase position of the cooling ribs varies across the circumference of a cooling flange with undulating cooling ribs. Then neighboring cooling ribs are not positioned parallel to each other but, depending on the phase displacement, are arranged displaced relative to each other.

In this way, the undulation of the cooling ribs in regard to the varying phase position can be optimized such that, independent of the rotational direction of the rotor cooling flange, the high cooling performance is achieved together with the high cooling air flow rates and high turbulence levels. This can be achieved, for example, in that the phase positions of the undulation function of all undulating cooling ribs of a cooling flange, defined in radians, are distributed approximately uniformly at an interval 0 to $2*\pi$, i.e., the influence of the phase positions of the individual undulating cooling ribs of a cooling flange, viewed across the circumference, is averaged out. A first condition for the substantially existing rotational direction independence of a cooling system is that the sum of the undulation function of all cooling ribs of a cooling flange has an amplitude which does not surpass 20% of the average amplitude of the undulation functions of these cooling ribs (i.e., phase position-caused cancellation effects prevail for additive superposition of the undulation functions).

A second condition whose observance further optimizes the rotational direction independence of the cooling performance and that advantageously is observed in combination with the first condition, is that the average value of the phase displacement, which is sign-affected relative to the rotational direction, between the phase positions of all pairs of respectively directly neighboring cooling ribs of a cooling flange, expressed dimensionless in radians, is not greater than $\pi/6$ in regard to value (absolute value). In this way, the influence of the sign of the phase displacement between neighboring cooling ribs over one revolution is approximately averaged out.

Advantageous in this context is that the phase displacement between two directly neighboring cooling ribs of a cooling flange is not too great. Advantageously, the phase displacement, expressed in radians, between two neighboring cooling ribs of a cooling flange is not greater than $\pi/3$ in absolute value. In this way, flow-beneficial channels can be formed between respectively neighboring cooling ribs.

Depending on the configuration of the cooling device, immediately neighboring cooling ribs must not mandatorily be different with regard to their phase position. For example, only every third or every fifth cooling rib can be changed with regard to its phase position relative to the respective undulating reference cooling rib under consideration.

A further condition for the rotational direction independence is provided in that the sign-affected angle of the straight reference line relative to the radial line, averaged across all cooling ribs of a cooling flange, is toward 0°, advantageously <5°. When all straight reference lines are aligned approximately radially, this condition is automatically fulfilled.

In order to substantially ensure the rotational direction independence of the cooling performance of cooling devices with undulating cooling flanges, it is particularly important to fulfill described conditions regarding the phase positions and straight reference lines of the cooling ribs for all heat-dissipating cooling flanges. For ideal rotational direction independence, the corresponding conditions should also be fulfilled however in case of the purely aerodynamic cooling flanges.

The subject matter of the application not only results from the subject matter of the individual claims but also from all specifications and features disclosed in the drawings and the description. They are claimed, even if they are not subject matter of the claims, as important to the invention insofar as, individually or in combination, they are novel relative to the prior art.

Further features of the invention result from the additional claims, the description, and the drawings.

BRIEF DESCRIPTION OF THE DRAWINGS

The invention will be explained in more detail with the aid of some embodiments illustrated in the drawings. It is shown in.

DESCRIPTION OF PREFERRED EMBODIMENTS

Figure 1:
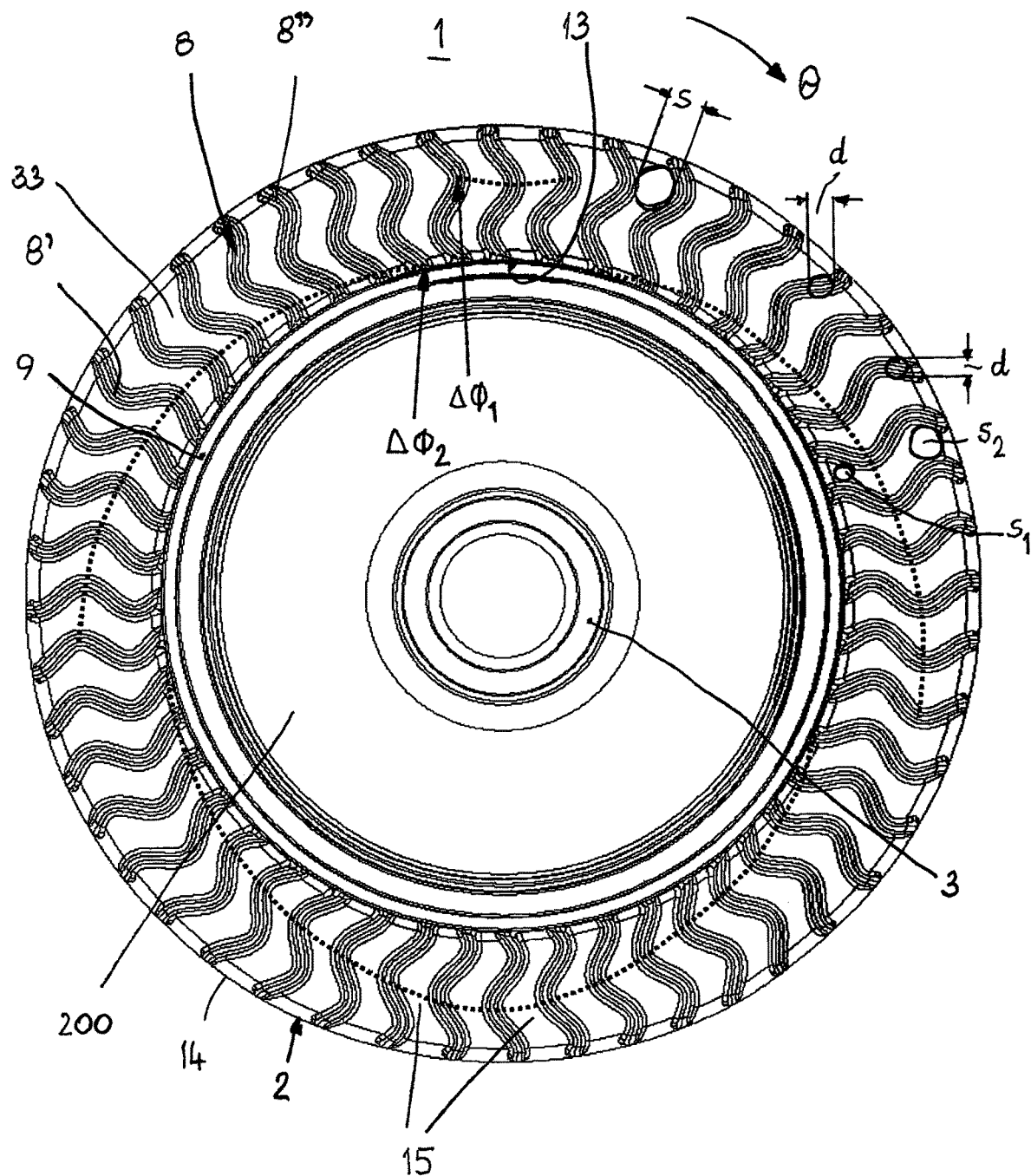
FIG. 1 an axial plan view of a stator bushing with a stator cooling flange of a cooling device according to the invention, viewed from the rotor side.
Figure 1A:
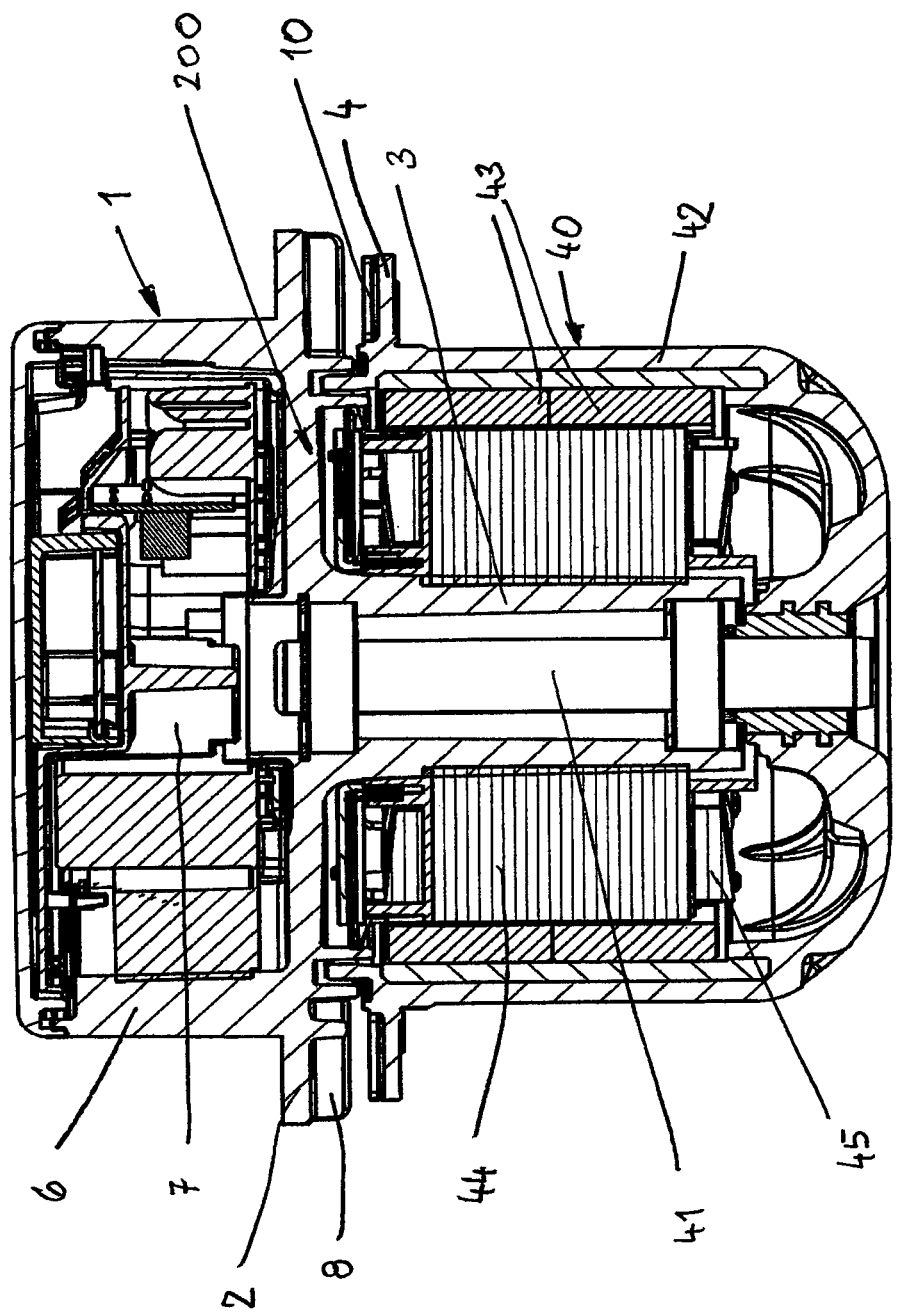
FIG. 1a in axial section an electric motor with a cooling device according to the invention.

FIG. 1a shows in an exemplary fashion an electric motor in the form of an external rotor motor that, for example, may be an electronically commutated direct-current motor. It comprises a stator bushing 1 with a cooling flange 2 from which centrally a bearing bushing 3 is projecting. It extends into a rotor 40 which is provided with a rotor shaft 41 which is rotatably supported in the bearing bushing 3 in a known manner. The rotor 40 has a rotor housing 42 having permanent magnets 43 attached to its inner side. They surround with formation of an annular air gap a stator pack 44 that is provided with a coil 45 in a known manner. The stator pack 44 is advantageously a sheet metal pack which is comprised of layered laminations.

Figure 2:
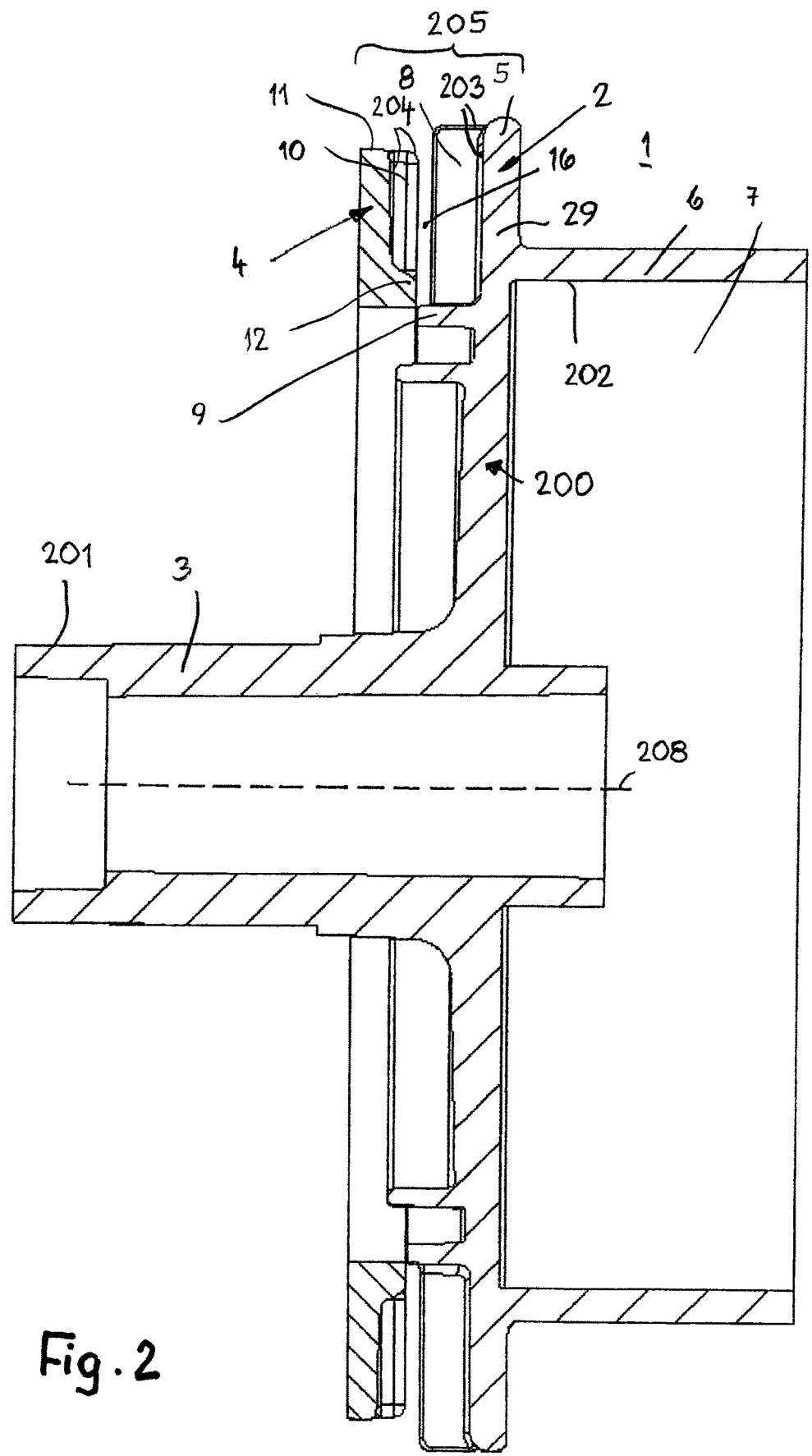
FIG. 2 in axial section the stator bushing according to FIG. 1, additionally with a rotor cooling flange of a cooling device according to the invention.

FIG. 1 shows an axial plan view, viewed from the rotor side, of the stator bushing 1 which is part of the stator of the external rotor motor. The stator bushing 1 has, as shown in FIG. 2, the stator flange 200 which is projecting radially away from the bearing bushing 3 which is advantageously embodied as one piece together with the stator flange 200 and in which the rotor shaft 41 of the rotor 40 is rotatably supported. In the embodiment, the sheet metal pack 44 with the stator windings 45 is applied to the exterior side 201 (FIG. 2) of the bearing bushing 3.

At a spacing from the outer rim 5 of the stator flange 200, a circumferentially extending wall 6 is extending transversely away therefrom and surrounds a receiving space 7 for electric/electronic components. In its radial outer region, a stator cooling flange 2 is provided integrally at the stator flange 200. It is provided with cooling ribs 8 which are arranged distributed about the circumference of the stator cooling flange 2. As can be seen in FIG. 1, the cooling ribs 8 are arranged, advantageously approximately uniformly distributed, about the circumference of the stator cooling flange 2. The cooling ribs 8 extend in radial direction approximately from the outer rim 5 of the stator flange 200 up to an annular projection 9 which is positioned coaxial to the bearing bushing 3 and which, as an example, has an outer diameter that is smaller than the inner diameter of the wall 6. The annular projection 9 and the wall 6 are positioned at different sides of the stator flange 200. Like the wall 6, the projection 9 is also advantageously formed as one piece together with the stator flange 200. The radial inner end of the stator cooling flange 2 is defined by the projection 9 or the radial inner ends of the cooling ribs 8.

In this embodiment, the heat which is produced in the electric or electronic components of the stator is dissipated through the surface 203 of the stator cooling flange 2 to the ambient air. This heat may originate, for example, at the winding and can be introduced through the surface 201 into the stator bushing 1 and/or originate in the region of the electronics in the receiving space 7 and introduced through the surface 202 into the stator bushing 1.

The surface 202 in the embodiment is the inner side of the wall 6. The stator bushing 1 is manufactured of a material that has good heat conducting properties, for example, aluminum. In this way, the heat can be conducted well to the stator cooling flange 2. The one-piece integral configuration of the stator cooling flange 2 with the stator bushing 1 enables in the embodiment an optimal heat conduction from the heat introducing surfaces 201, 202 to the heat dissipating surface 203 of the stator cooling flange 2.

Figure 3:
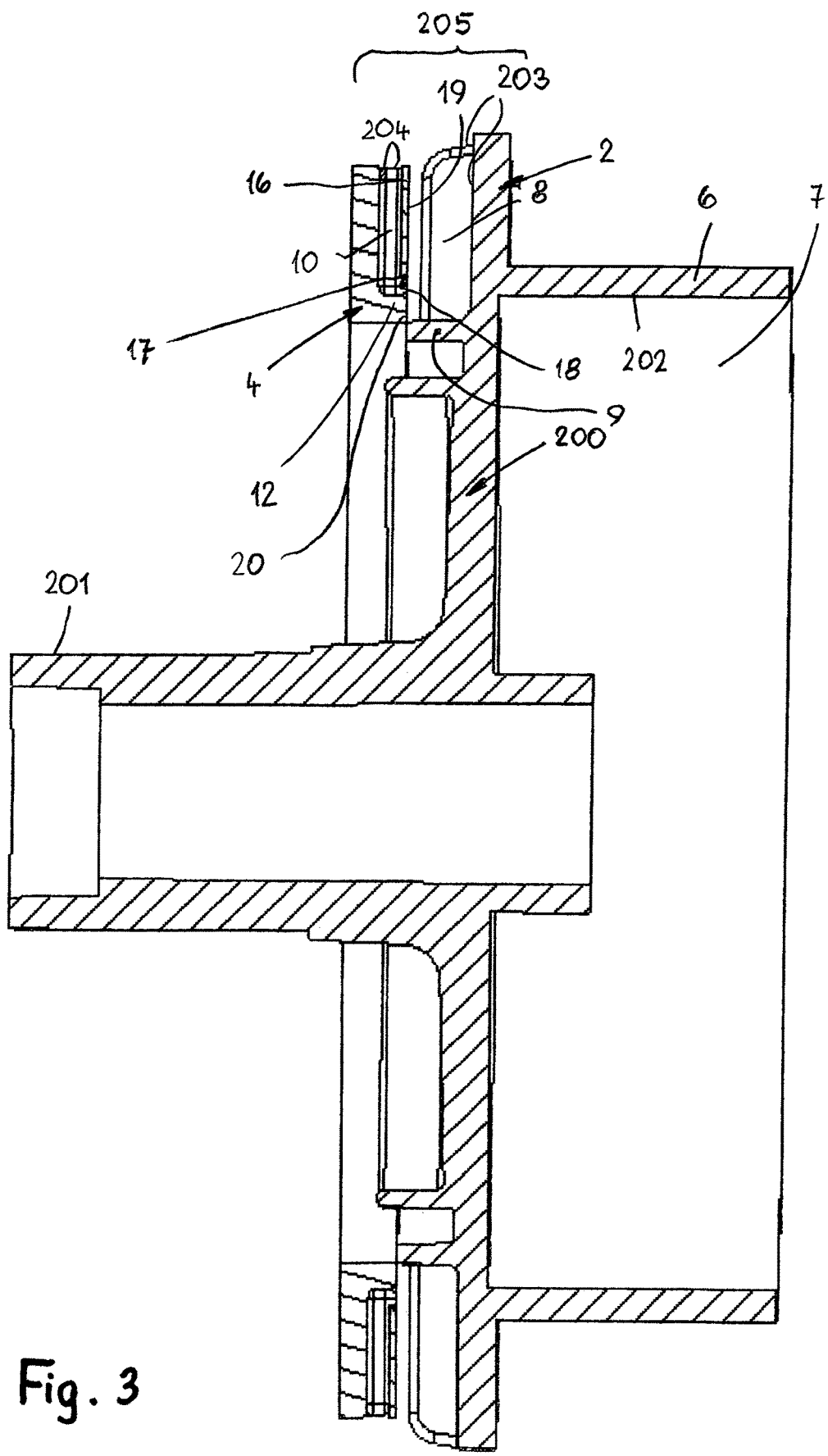
FIG. 3 in an illustration corresponding to FIG. 2 a further embodiment of a cooling device according to the invention with illustrated stator bushing.
Figure 4:
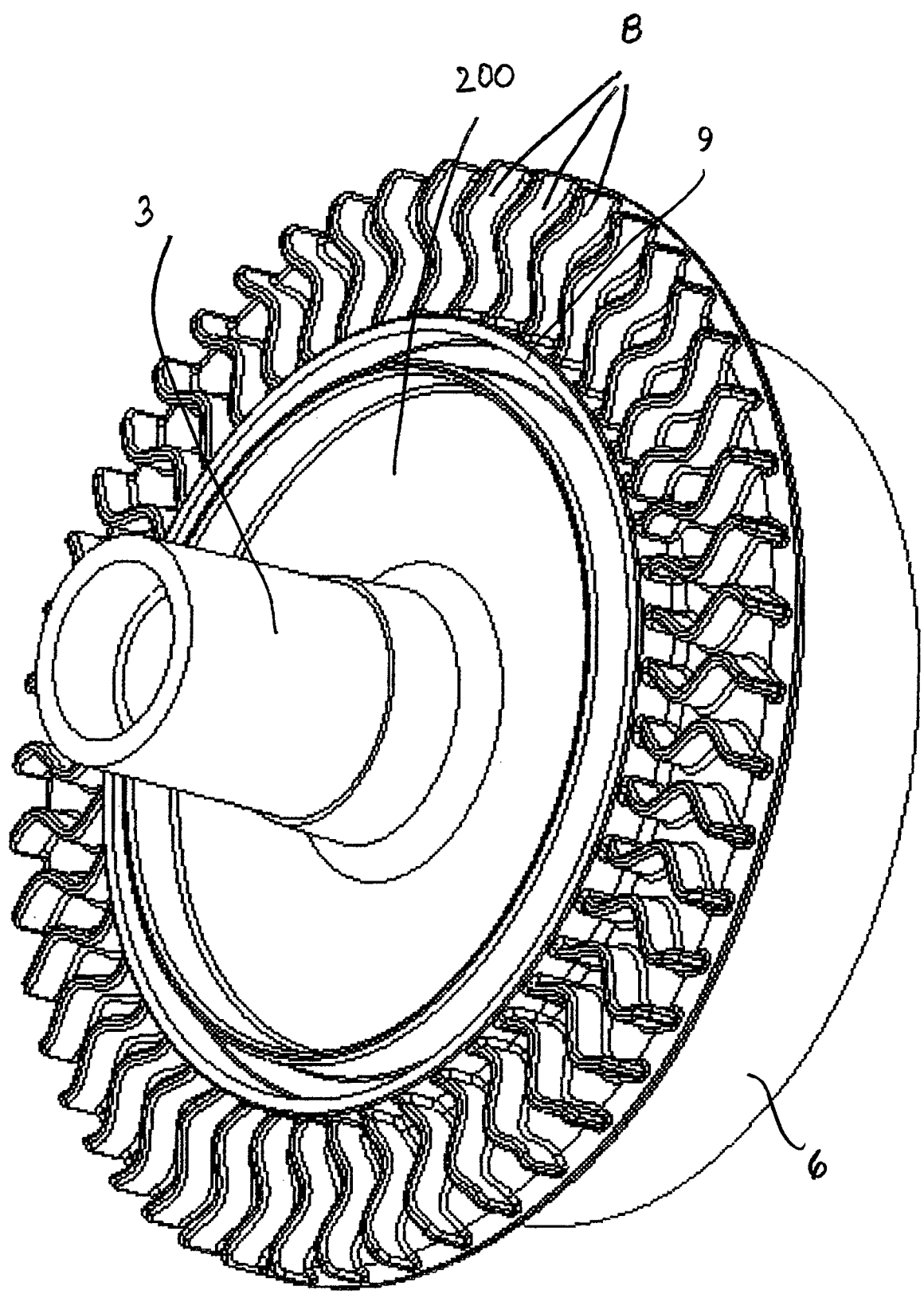
FIG. 4 in perspective illustration the stator bushing according to FIG. 1 in a view at a slant from the front.

At the rotor 40, as shown in FIG. 2 but also in the embodiment according to FIG. 3, on the exterior side a rotor cooling flange 4 is provided which, in operation of the motor, rotates together with the rotor 40 about the axis 208 of the bearing bushing 3. In FIGS. 2 and 3, only the rotor cooling flange 4 of the rotor is illustrated with cooling ribs 10 arranged thereon and formed as one piece together therewith. The cooling ribs 10 extend from the outer rim 11 of the rotor cooling flange 4 up to an annular projection 12. The two cooling flanges 2 and 4 are positioned with minimal spacing opposite each other. In this context, the cooling ribs 8 and 10 are facing each other. The rotor cooling flange 4 can be formed integrally as one piece with the rotor 40 or can be a separate part which is fastened to the other parts of the rotor. A cooling device 205 in the meaning of the invention is comprised of the two oppositely positioned cooling flanges 2, 4 with the cooling ribs 8 and 10. In operation of the motor, the two cooling flanges 2, 4 exhibit a rotatory relative movement relative to each other. Each cooling flange 2, 4 can serve to provide heat dissipation at its surface 203, 204 to the ambient air and/or can decisively promote the heat dissipation of the cooling device 205 at one of the cooling flanges 2, 4 by an aerodynamically effective interaction as a result of the relative movement of the two cooling flanges 2, 4 relative to each other. When the cooling flange 2, 4 serves to provide heat dissipation at its surface 203, 204, it is advantageously formed of a well heat-conducting material as one piece together with further parts that absorb the heat at other locations.

When it serves only for aerodynamic interaction, it can be manufactured also as a separate plastic element, for example. The function of the heat dissipation, depending on necessity, can be provided by the stator cooling flange 2, the rotor cooling flange 4, or both cooling flanges 2, 4.

The described basic configuration of the external rotor motor is known so that it will not be described in more detail.

Figure 11:
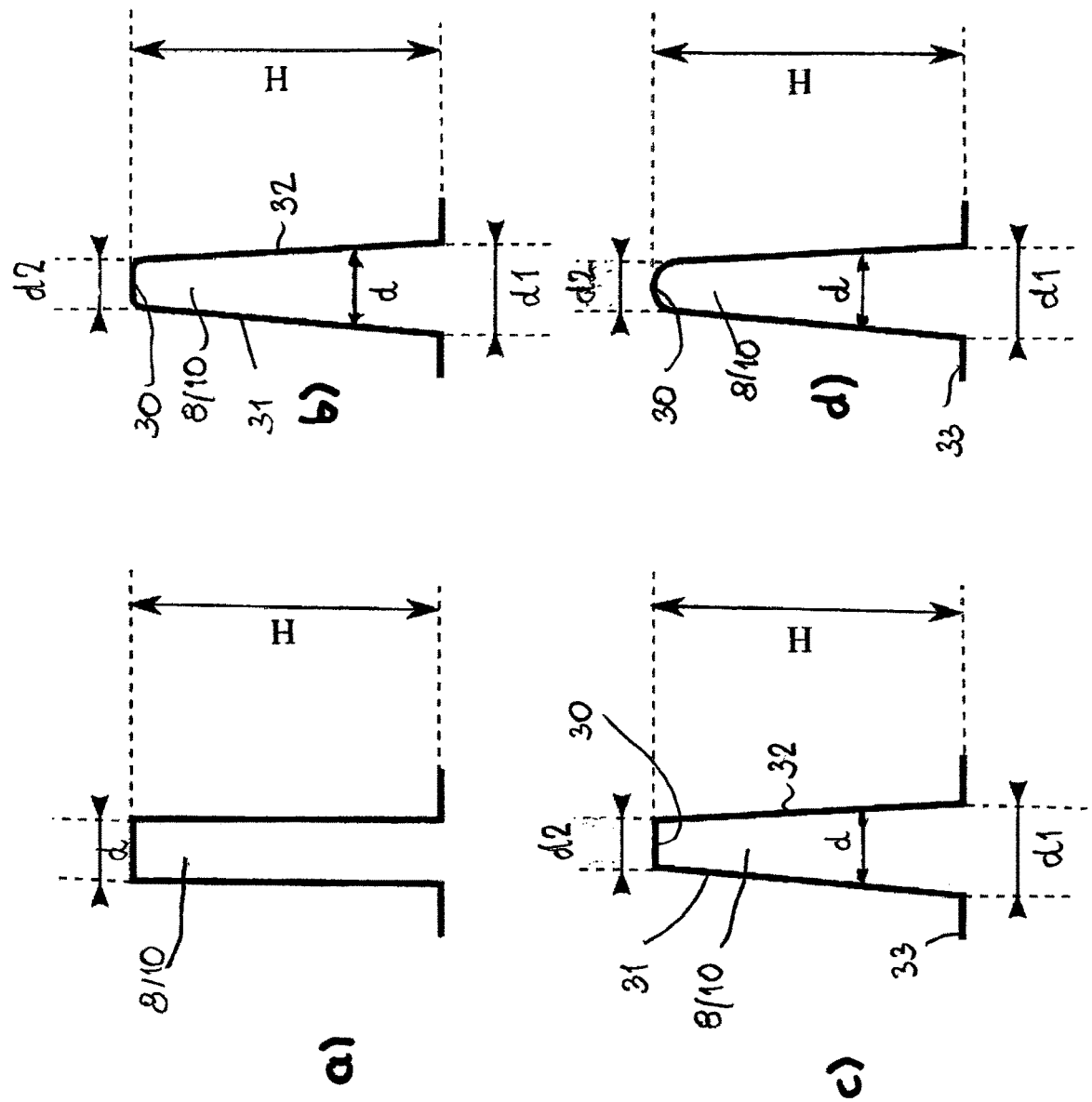
FIG. 11a to FIG. 11d in enlarged and schematic illustration different cross-sectional shapes of the cooling ribs.

Advantageously, the cooling ribs 8, 10 have a height H (FIG. 11), measured approximately perpendicular to the base surface 33 (FIG. 1) of the cooling flange 2, 4, which does not project past the height of the associated annular projection 9, 12.

As shown in FIG. 2, the cooling ribs 10 of the rotor cooling flange 4 in the embodiment have a reduced radial length in comparison to the cooling ribs 8 of the stator cooling flange 2. In addition, the stator cooling flange 2 in the illustrated embodiment projects radially past the rotor cooling flange 4. The described dimensions of the cooling ribs 8, 10, of the annular projection 12, as well as of the stator cooling flange 2 and of the rotor cooling flange 4 are not limited to the illustrated and described dimensions. Thus, the cooling ribs 8, 10 can also have the same radial extension, for example. It is likewise possible that the stator cooling flange 2 and the rotor cooling flange 4 have the same outer diameter. In the embodiment, the cooling ribs 8 of the stator cooling flange 2 have significantly greater dimensions than the cooling ribs 10 of the rotor cooling flange 4 because they serve for heat dissipation which is promoted through a greater contact surface between the heat-dissipating body and the ambient air, while the cooling ribs 10 of the rotor cooling flange 4 in the embodiment have only an aerodynamic function and thereby decisively promote the heat dissipation of the cooling device 205.

In use of the external rotor motor, the rotation of the rotor cooling flange 4 relative to the stator cooling flange 2 generates an air flow between the cooling ribs 8 and 10 which absorbs the heat from cooling flange surfaces 203 and/or 204 and transports it away. The rotor cooling flange 4 with cooling ribs 10 acts in the embodiment in a way comparable to a radial fan wheel and conveys air at high speed from the interior to the exterior and throws this air, which has absorbed the heat to be dissipated from the cooling flange surface 203 and/or 204, radially away from the motor. As a result, in the radial inner region of the cooling device 205 a vacuum is created and fresh ambient air is sucked in radially at the stator cooling flange 2 with the cooling ribs 8 from the exterior to the interior, whereby it absorbs the waste heat. In addition, by the immediate interaction of the oppositely positioned cooling ribs 8 and 10, a high turbulence is generated which further promotes the heat dissipation to the air. However, this interaction can also be the cause of a strong noise development, in particular when all cooling ribs 8 and 10 are radially aligned and are straight (prior art) or when they are designed such that, at a given relative position of stator cooling flange 2 and rotor cooling flange 4, cooling ribs 8 and 10 across their entire common radial extension are exactly positioned opposite each other and extend parallel, i.e., they have across their extension no or only a very small angle relative to each other when they are positioned straight opposite each other. Due to the design of the cooling ribs 8 and 10 according to the invention in undulating shape, this rotation sound development is significantly reduced.

Figure 9:
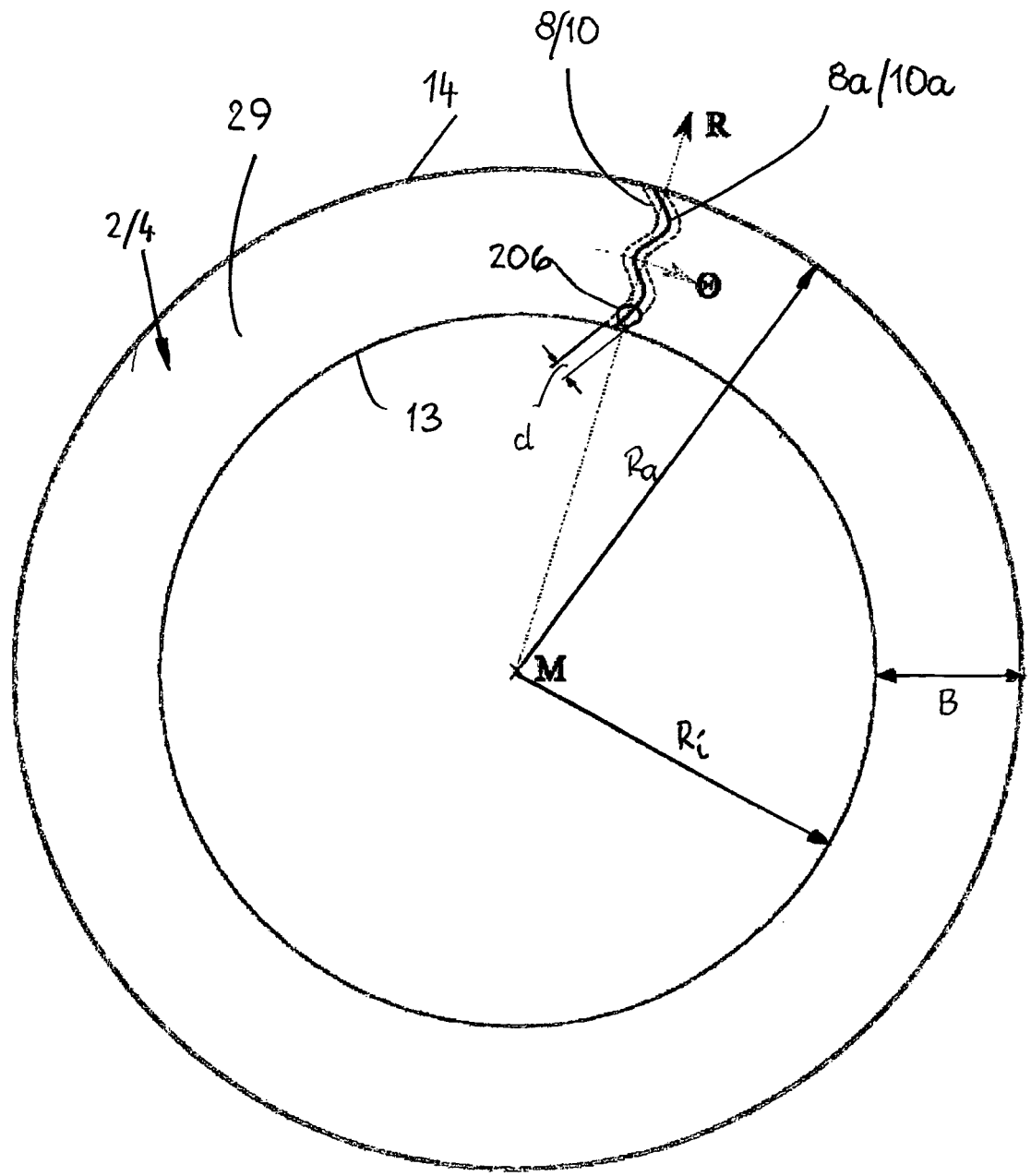
FIG. 9 in schematic illustration an individual cooling rib on a cooling flange.

The cooling ribs 8 of the stator cooling flange 2 are of an undulating shape in the embodiment according to FIG. 1. FIG. 9 shows in plan view schematically a cooling flange 2, 4, which can be a rotor cooling flange or a stator cooling flange, with only one illustrated undulating cooling rib 8, 10. The radial inner rim line 13 (envelope circle) of the cooling flange 2, 4 that can be defined by the radial inner end of the cooling ribs 8, 10, has a radius Ri. The radial outer rim line 14 (envelope circle) of the cooling flange 2, 4 that can be defined by the radial outer end of the cooling ribs 8, 10 has a radius Ra. The radial extension of the cooling flanges 2, 4 is therefore B=Ra−Ri.

The outer contours (silhouettes) of the cooling ribs 8, 10 are illustrated in dashed lines wherein the spacing of these outer contours characterizes always approximately a cooling rib thickness d of the cooling rib 8, 10. The cooling rib thickness d, at a radial and axial position within the corresponding cooling rib 8, 10, is the diameter of the respective inscribed ball 206 (FIG. 9) that can barely fit between the two cooling rib walls. The cooling rib-averaged cooling rib thickness dmr is defined as the averaged thickness d for each cooling rib 8, 10. The average cooling rib thickness dm of a cooling flange 2, 4 is approximately the averaged thickness dmr of all cooling ribs of the cooling flange 2, 4. In FIG. 9, for the cooling rib 8, 10 also the cooling rib center line 8a, 10a is illustrated by means of which the undulation of the cooling rib 8, 10 can be described well. This cooling rib center line 8a, 10a can be defined in that the areal centers of all section surfaces of a cooling rib 8, 10 are connected to each other with cylinder surfaces of different radii coaxially to the rotation axis M.

Figure 10:
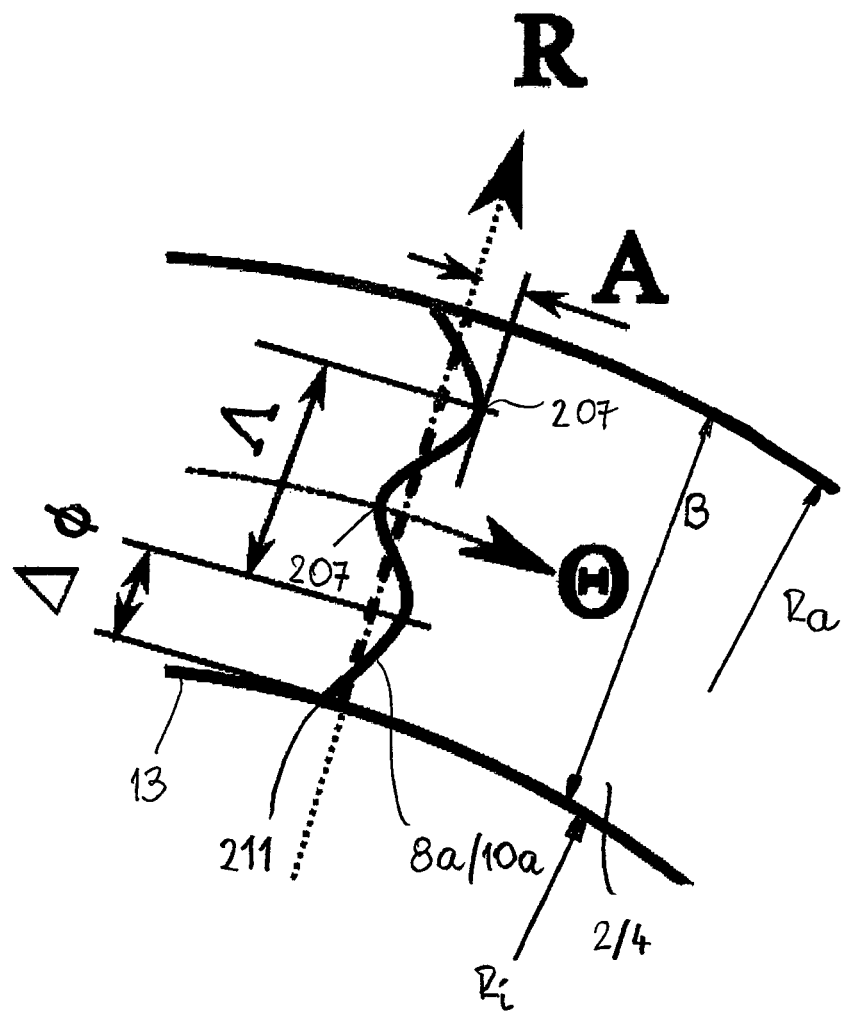
FIG. 10 in enlarged and schematic illustration the cooling rib according to FIG. 9, illustrated by its cooling rib center line with characteristic parameters.

In FIG. 10, in an enlarged illustration a cooling rib 8, 10 of a cooling flange 2, 4 is illustrated schematically by the course of its cooling rib center line 8a, 10a. This cooling rib center line 8a, 10a according to FIG. 10 is viewed in a projection onto the viewing plane which, in the example, is perpendicular to the axis of rotation of the motor. For explaining the term "undulating", a straight reference line R is also considered which intersects the cooling rib center line 8a, 10a at least twice, advantageously three times. Therefore, when a cooling rib center line 8a, 10a has a substantially straight non-undulating course, it has relative to the straight reference line R no or only minimal deflections. However, an undulating cooling rib center line 8a, 10a has across its radial extension alternating deflections in positive and negative circumferential direction Θ. The straight reference line R should now always be positioned such that the deflections of the cooling rib center line 8a, 10a in positive and negative circumferential direction Θ are symmetrical to the straight reference line R as much as possible. For a more precise explanation, the maximum deflections 207 of the cooling rib center line 8a, 10a are also defined which are local extremes of the deflection. In this context, the inner and outer ends of the cooling rib center line 8a, 10a are considered a maximum deflection only when it is apparent from the course of the curve that at these locations, even for an imaginary curve extension, a local maximum exists. The straight reference line R can now be defined such that two neighboring maximum deflections always have the same absolute value or, when averaged across all maximum deflections of a cooling rib center line 8a, 10a, have deviations as minimal as possible from each other in their absolute value. In the embodiment according to FIG. 10, this straight reference line R is aligned precisely in radial direction but it can also be positioned at an angle to the radial line. As undulation function of each cooling rib 8, 10, the difference between its cooling rib center line 8a, 10a and its straight reference line R as a function of the running length on R is defined. In this context, the zero point 211 is placed onto the intersection point of R with the inner envelope circle 13. An undulating cooling rib 8, 10 has an undulation function that, across the course of the cooling rib 8, 10, has at least two (local) extremes, preferably at least three.

According to FIG. 10, the undulating course of the cooling ribs 8, 10 can be characterized by means of its cooling rib center line 8a, 10a and the undulation function derived therefrom in particular by amplitude A, wavelength $\Lambda$, and phase position $\Delta\Phi$. The absolute value of a local extreme value of the undulation function is always defined as amplitude A of the undulation of the cooling rib center line 8a, 10a. The wavelength $\Lambda$ is the spacing between two sequential local maxima or two sequential local minima of the undulation function of the cooling rib center line 8a, 10a. The magnitude of the amplitude A or of the wavelength $\Lambda$ can be constant or can vary across the course of the cooling rib center line 8a, 10a. Since the amplitude A and/or the wavelength $\Lambda$ across a cooling rib center line 8a, 10a can be variable, for each cooling rib 8, 10 or its cooling rib center line 8a, 10a a rib-averaged amplitude Amr or a rib-averaged wavelength $\Lambda$ is also defined which represent respectively and for each cooling rib center line 8a, 10a the average value of all determinable amplitudes A or wavelengths $\Lambda$. The phase position $\Delta\Phi$ describes the position of the first maximum (in positive circumferential direction $\Theta$, not minimums) of the undulation function of a cooling rib 8, 10 relative to its point of origin or zero point 211. The phase position $\Delta\Phi$ in radians is defined by $\Delta\varphi=2*\pi*\Delta\Phi/\Lambda mr$ with pi $\pi$ and the rib-averaged wavelength $\Lambda mr$.

Due to the undulating configuration of the cooling ribs 8, 10, under certain boundary conditions, the surface 203, 204 in particular of a heat-dissipating cooling flange 2, 4 can be enlarged in comparison to straight, or radial and straight, cooling ribs so that the heat dissipation of the cooling flange 2, 4 can be improved significantly. The boundary conditions are in particular provided by the available installation space in radial and axial direction, by a minimal cooling rib thickness d of the cooling ribs 8, 10 in regard to manufacturing technological reasons, and a minimal spacings (FIG. 1) of neighboring cooling ribs 8, 10 relative to each other, wherein fluid mechanical aspects must be taken into consideration. For the air that is flowing between respective neighboring cooling ribs 8, 10, it is namely necessary to ensure a sufficient flow surface approximately transverse to the flow direction, i.e., in particular a satisfactory large cooling rib spacing s. The cooling rib spacing s is defined at any location between two neighboring cooling ribs 8, 10 by the diameter of the ball that still barely fits between the flanks of two neighboring cooling ribs 8, 10 (see FIG. 1). The two boundary conditions mentioned last (cooling rib thickness d and cooling rib spacing s) are the reasons that the number of ribs in the circumferential direction cannot be increased arbitrarily in order to achieve a good heat dissipation.

For any undulating cooling rib 8, 10, a straight (not undulating) reference cooling rib can be defined also by means of the straight reference line R. This straight reference cooling rib whose imaginary cooling rib center line is precisely positioned on R has the same axial and radial extension as the corresponding undulating cooling rib as well as the same thickness course. In comparison to its straight reference cooling rib, an undulating cooling rib 8, 10 has a significantly larger surface which is advantageous for heat dissipation. The ratio of the surface of an undulating cooling rib 8, 10 and its straight reference cooling rib depends primarily on the amplitude A and the wavelength $\Lambda$, relative to the radial extension B of the cooling rib 8, 10. Advantageously, it amounts to at least 1.05 for an undulating cooling rib 8, 10.

In addition to improving the heat dissipation as a result of the surface enlargement, by means of the undulating configuration of the cooling ribs 8, 10 also further advantages of the heat dissipation can be achieved in that the flow velocities and turbulence levels can be increased compared to a straight configuration of the cooling ribs.

In many embodiments, it is sufficient that one of the two cooling flanges 2 or 4 is provided with undulating cooling ribs 8 or 10. In particular when only one of the cooling flanges has a heat-dissipating function, it may be sufficient that this heat-dissipating cooling flange is provided with undulating cooling ribs 8 or 10.

By suitable configuration of the undulating cooling ribs 8, 10 of rotor cooling flange 4 and/or stator cooling flange 2, the rotation sound generation can be significantly reduced compared to straight or non-undulating configuration of all cooling ribs.

In order to achieve a very good heat dissipation, the wavelengths $\Lambda$, the amplitudes A, the phase positions $\Delta\Phi$ in interaction with the cooling rib thicknesses d (FIG. 1), the cooling rib number, the inner and outer radii Ri and Ra of the cooling flanges 2, 4, and the resulting radial extension B=Ra−Ri of the cooling flange 2, 4 as well as also the height H of the cooling ribs 8, 10 must be matched to each other. In this context, the height H of the cooling ribs 8, 10 is its extension approximately perpendicular to the base surface 33 of a cooling flange 2, 4; see also FIG. 11. The use of computational fluid dynamics (CFD) lends itself to performing such optimization tasks by means of which the cooling behavior of a cooling device 205 can be simulated with a computer model. In this context, in particular the parameters $\Lambda$, A, and $\Delta\Phi$ can vary between stator cooling flange 2 and rotor cooling flange 4 as well as between neighboring cooling ribs 8, 10. For the amplitude A and the wavelength $\Lambda$, also their average values Am and $\Lambda$m across the entire cooling flange 2, 4 are introduced, which represent average values of amplitude A or wavelength $\Lambda$ for all radial positions as well as all cooling rib center lines 8a, 10a of a cooling flange 2 or 4. A value of 20 to 45% of the radius Ri of the inner envelope circle 13 has been found to be particularly advantageous for the radial extension B of a heat-dissipating cooling flange 2, 4. Cooling flanges 2, 4 which are not heat-dissipating are advantageously more compact in regard to their radial extension B and have a value for B of 10%-30% of Ri.

In an advantageous embodiment of a heat-dissipating cooling flange, the wavelength $\Lambda$ is in the range of 70%-170% of B. Lower values of $\Lambda$ would further enlarge the surface of the cooling ribs 8, 10 but negatively affect the airflow. An amplitude A is advantageously 0.1 times to 0.3 times the wavelength Λ. Selecting such an amplitude leads to advantageous heat dissipation at a heat-dissipating cooling flange 2, 4 as well as to a significant reduction of the rotation sound in case the cooling ribs 8, 10 of at least one of the two cooling flanges 2, 4 are embodied in this way. The average cooling rib thickness dm of the cooling ribs 8, 10 of the cooling flange 2, 4 is advantageously smaller than the average cooling rib spacing sm of the cooling flange 2, 4 that characterizes the width of the flow channel 15 formed between the two neighboring cooling ribs 8, 10; advantageously 6>sm/dm>1.5 applies.

As can be seen in FIG. 1, in the illustrated embodiment the phase position ΔΦ of the cooling ribs 8 varies across the circumference of the stator cooling flange 2. In FIG. 1, as an example the corresponding phase positions ΔΦ are indicated for three cooling ribs 8.

By variation of the phase position ΔΦ or Δφ of undulating cooling ribs 8, 10 across the circumference of a cooling flange 2, 4, it is possible to ensure the high cooling performance independent of the rotational direction Θ of a rotor cooling flange 4 relative to a stator cooling flange 2. In the embodiment according to FIG. 1, n=48 undulating cooling ribs 8 are provided about the circumference of the stator cooling flange 1. With dashed lines, the course of the phase position of the individual cooling ribs 8 is illustrated. This phase position course across the circumference of the stator cooling flange 2 is to be understood only as an example. The phase position course is selected such that the desired cooling action occurs independent of the rotational direction Θ of the cooling fan wheel 4.

Without a variation of the phase position of undulating cooling ribs 8, 10 relative to the cooling performance of the cooling device 205, a preferred rotational direction is produced, i.e., in such a configuration the cooling action of the cooling device 205 is higher for one rotational direction than for the oppositely oriented one. The degree of difference in the rotational direction-dependent cooling action is larger when in case of a heat-dissipating cooling flange 2, 4 with undulating cooling ribs 8, 10 the phase position ΔΦ is not suitably varied in comparison to an aerodynamically acting cooling flange 2, 4. Thus, it may be that, in case of an only aerodynamically acting cooling flange 2, 4, undulating cooling ribs 8, 10 without variation of the phase position ΔΦ can be used without the rotational direction dependency of the cooling action reaching critical values.

Of course, a cooling device 205 with undulating cooling ribs 8 or 10 on the stator cooling flange 2 and/or on the rotor cooling flange 4 which has a better cooling performance for one rotational direction than for the oppositely oriented direction can generally be used also for motors. This is in particular the case when the motor is used only for a defined rotational direction.

Figure 12:
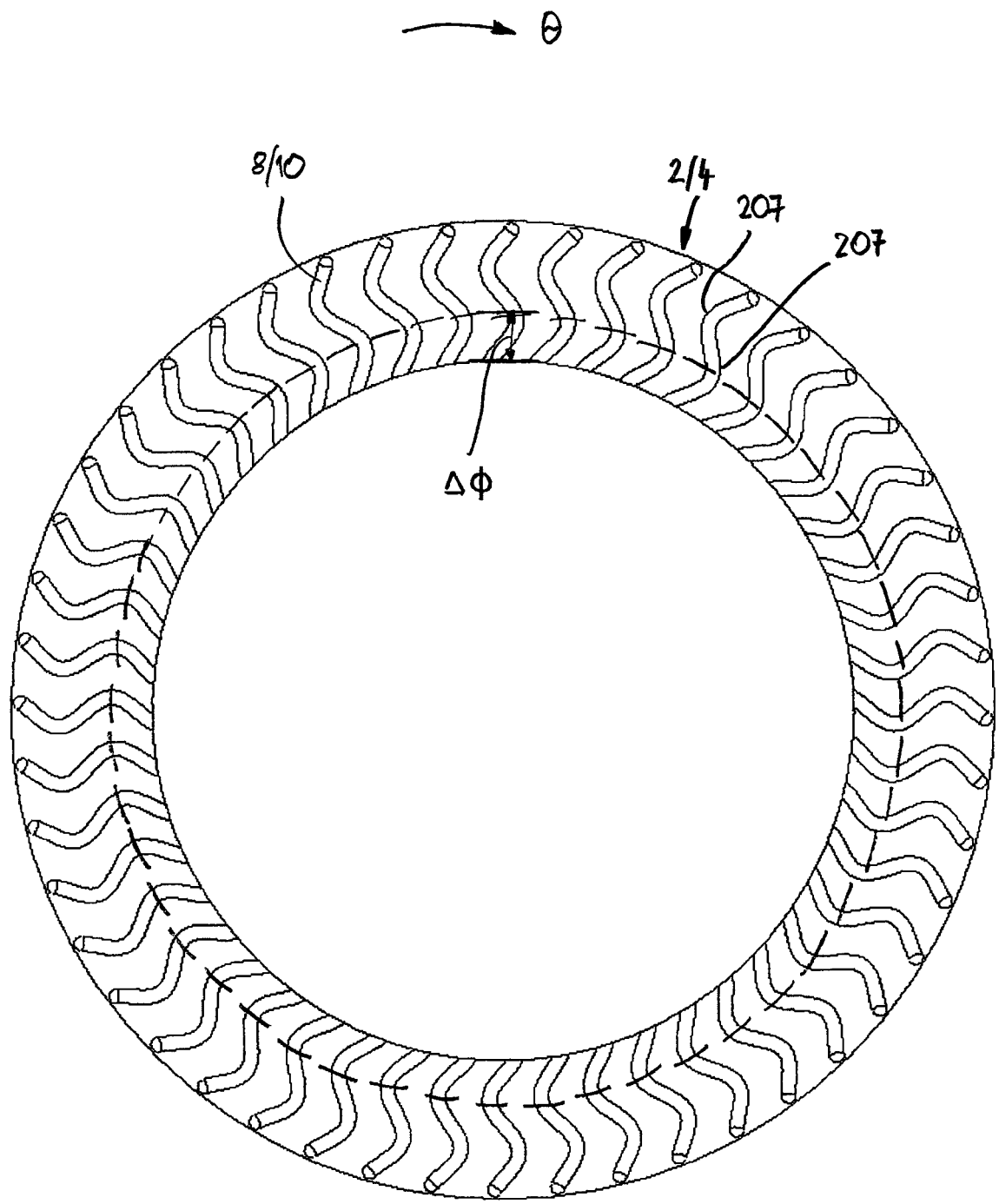
FIG. 12 in plan view a further embodiment of a cooling flange of a cooling device according to the invention, wherein all undulating cooling ribs have the same phase position and the cooling performance is rotational direction-dependent.

A cooling flange 2, 4 with undulating cooling ribs 8, 10 with constant phase position is illustrated in FIG. 12. When a heat-dissipating cooling flange 2, 4 is embodied in this way, a significant dependency of the heat dissipation on the rotational direction Θ of the motor develops. In particular, a very high heat dissipation can be achieved in this preferred rotational direction. However, such a cooling flange 2, 4 would be less suitable for motors which are to be used with both rotational directions.

Figure 14:
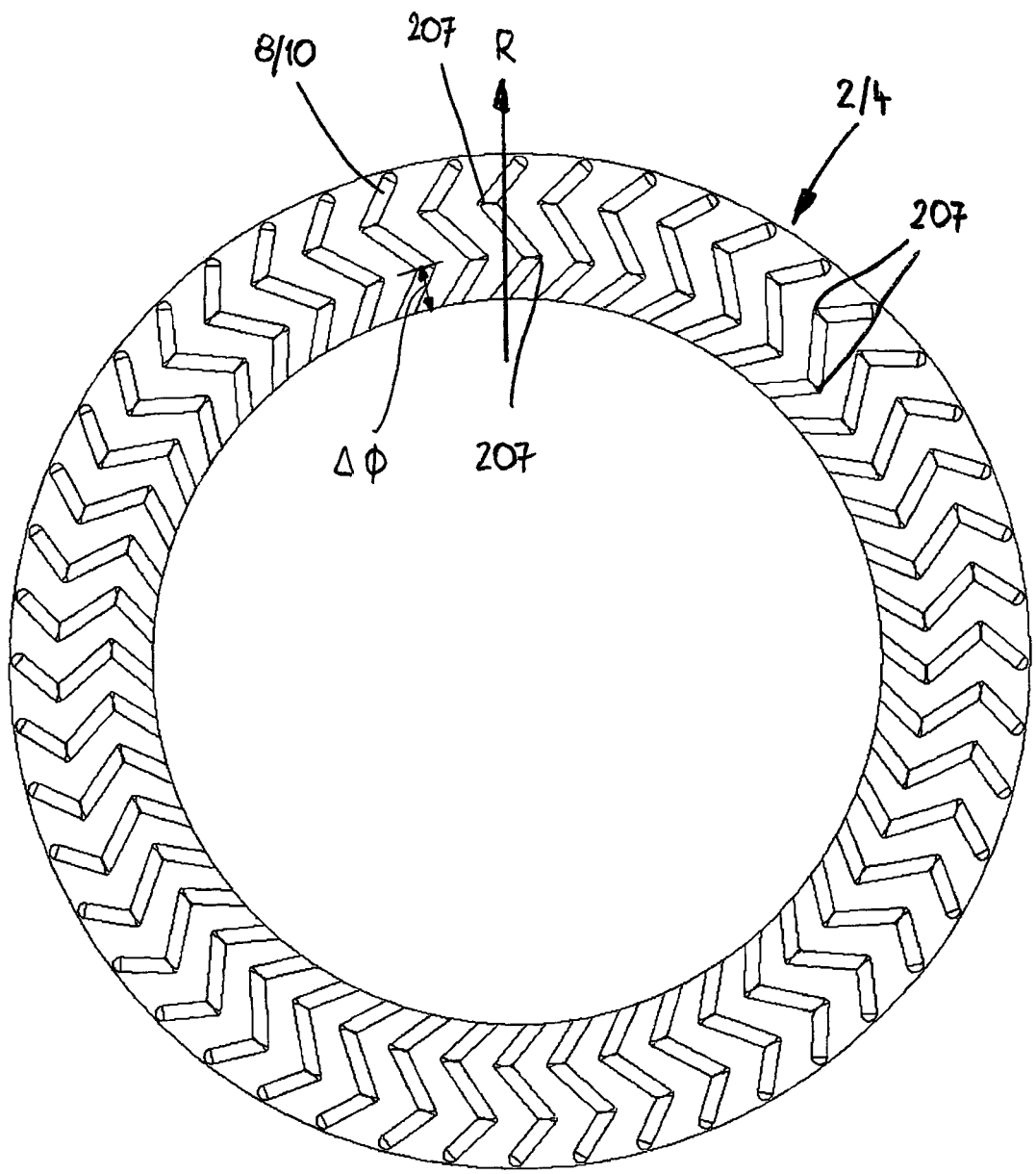
FIG. 14 in plan view a further embodiment of a cooling flange of a cooling device according to the invention wherein the undulating cooling ribs have more of a zigzag shape course.

In FIG. 14, a cooling flange 2, 4 with undulating cooling ribs 8, 10 with constant phase position is also illustrated. In contrast to the embodiment according to FIG. 12, the undulation function of the cooling ribs 8, 10 has a different shape. While in the embodiment of FIG. 10, for example, a rather round contour exits and the shape of the undulation functions in regard to their course approximates more a sine function in the region of the maximal deflections 207 of the undulation function of the cooling ribs 8, 10, the embodiment according to FIG. 14 exhibits a more pointed or angled shape in the region of the maximal deflections 207 of the undulation function of the cooling ribs 8, 10. The course is therefore more zigzag-shaped. The cooling rib center line 8a, 10a of an undulating cooling rib 8, 10 comprises across its radial extension alternating deflections in positive and negative circumferential direction Θ relative to a straight reference line R. In particular, the undulation function has at least two local extremes (maxima or minima). The course of the undulation function in this context can assume various shapes, for example, adjoining conical section segments, zigzag shape, sawtooth shape, sine shape or shapes derived therefrom, or stepped shape.

The fulfillment of a first criterion regarding the phase positions ΔΦ of all undulating cooling ribs 8, 10 of a cooling flange 2, 4, in particular of a heat-dissipating cooling flange 2, 4, ensures a similar cooling action of a cooling device 205 for both rotational directions. This criterion means that the phase positions Δφ, expressed dimensionless in radians, of the undulation functions of all cooling ribs 8 or 10 of a cooling flange 2, 4 in the range of 0 to 2*π are approximately uniformly distributed. If the undulation functions of all cooling ribs 8, 10 of a cooling flange 2 or 4 were averaged, i.e., added and then divided by the number of cooling ribs n, the result would be an average undulation function with comparatively minimal amplitude because cancellation effects would prevail. Advantageously, the value of the amplitude of the averaged undulation function is not greater than 20% of the value of the average amplitude Am of all cooling ribs 8 or 10.

One construction possibility which ensures the fulfillment of this criterion is that each cooling rib 8 or 10 is correlated, by forming pairs, with precisely one other cooling rib 8' or 10' of the same cooling flange 2 or 4 which comprises approximately the same radial amplitude course A and approximately the same radial wavelength course Λ and, in regard to its phase position Δφ, differs by approximately π from that of the other cooling rib 8 or 10. In an exemplary fashion, one pair of such stator cooling ribs 8 and 8' is identified in FIG. 1 and FIG. 5.

Fulfilling a second criterion regarding the phase positions ΔΦ of all undulating cooling ribs 8, 10 of a cooling flange 2, 4, in particular of a heat-dissipating cooling flange 2, 4, ensures in combination with fulfilling the first criterion an almost identical cooling action of a cooling device 205 for both rotational directions. For explanation purposes, the phase displacement ΔΔΦ which represents the sign-affected difference in the phase position ΔΦ between two neighboring cooling ribs is considered for a pair of directly neighboring cooling ribs 8, 8" or 10, 10": ΔΔΦ=ΔΦ 8" or 10"−ΔΦ 8 or 10. In this context, 8" or 10" is always the cooling rib which is neighboring 8 or 10 in rotational direction. The second condition is fulfilled when the averaged sign-affected phase displacements ΔΔΦ of all possible pairs of neighboring cooling ribs 8, 8" or 10, 10" of a cooling flange 2 or 4 is near 0, which means that positive and negative phase displacements across the circumference approximately cancel each other. Advantageously, this average phase displacement, expressed dimensionless in radians, has an absolute value not greater than π/6.

A construction possibility that ensures fulfillment of the second criterion is that each displacement ΔΔΦ (1) of directly neighboring cooling ribs has assigned thereto precisely one other ΔΔΦ (2) that is identical with regard to absolute value and has a different sign. Advantageously, the undulation functions of the cooling ribs of the displacement ΔΔΦ (1), suitably compared in pairs with cooling ribs of the displacement ΔΔΦ (2), each have approximately the same amplitude course and wavelength course and are advantageously phase-displaced relative to each other by approximately Δφ=π.

Figure 5:
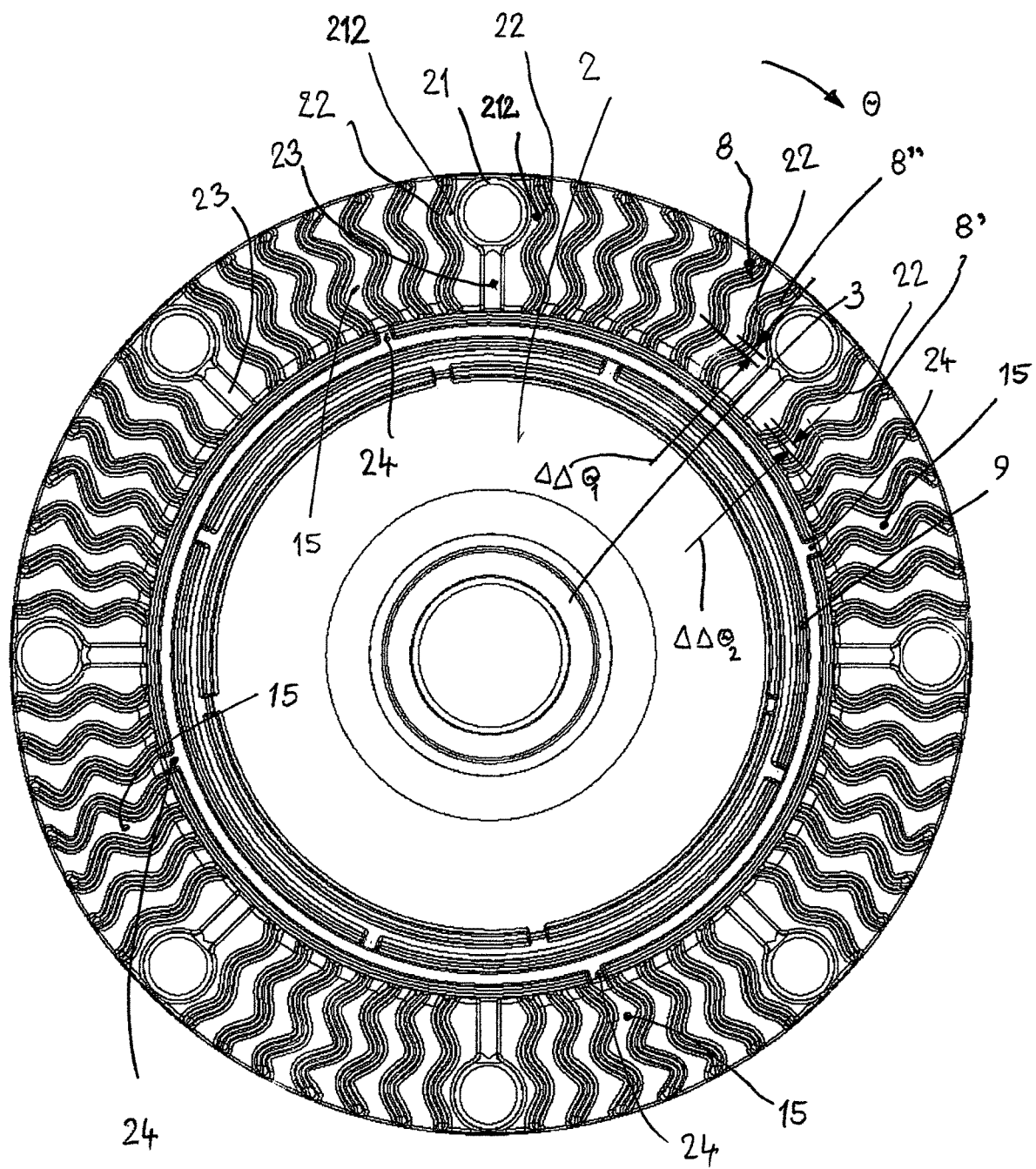
FIG. 5 in axial plan view a stator bushing with a further embodiment of a stator cooling flange of a cooling device according to the invention.

In FIG. 5, two such complementary phase displacements ΔΔΦ (1) and ΔΔΦ (2) are identified as an example.

A further condition for the rotational direction independence is provided in that the sign-affected angle of the straight reference line R relative to the radial line, averaged across all cooling ribs of a cooling flange, is toward 0°, advantageously <5°. When all straight reference lines are approximately radially aligned, this condition is automatically fulfilled.

Figure 13:
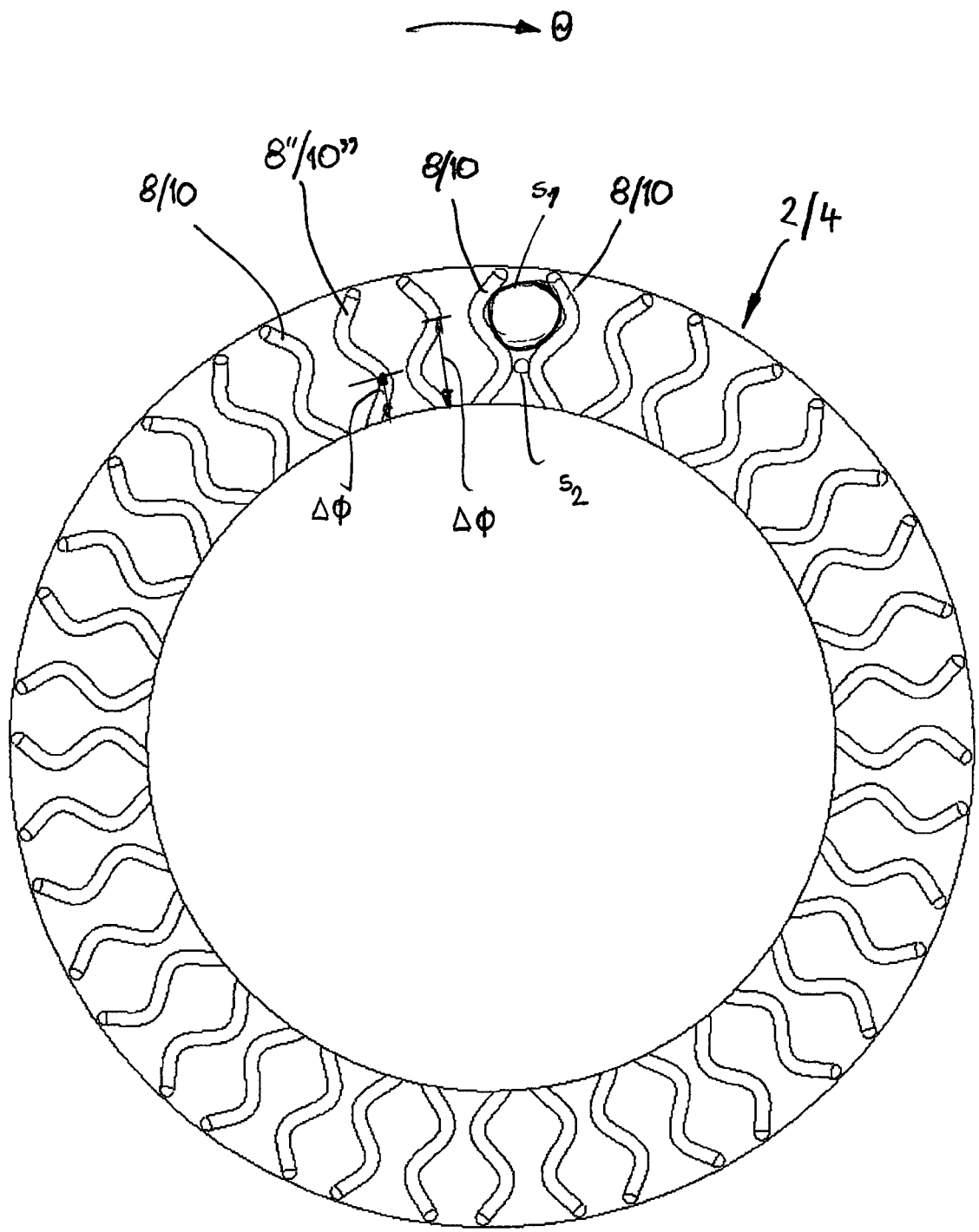
FIG. 13 in plan view a further embodiment of a cooling flange of a cooling device according to the invention, wherein respective neighboring cooling ribs differ in their phase position, expressed in radians, alternatingly by $+\pi$ and $-\pi$ and the cooling performance is substantially rotational direction-independent.

In FIG. 13, a further embodiment of a cooling flange 2, 4 with undulating cooling ribs 8, 10 is illustrated. The cooling rib of pairs 8, 8" or 10, 10" have, always alternatingly, dimensionless phase displacements ΔΔφ of approximately +π and −π, i.e., dimension-affected phase displacements ΔΔΦ of approximately one half wavelength. This configuration of a cooling flange 2, 4 with regard to phase position ΔΦ of all undulating cooling ribs 8, 10 (inclusive 8", 10") leads to a substantially rotational direction-independent cooling performance of the cooling flange 2, 4 because in particular the two conditions 1 and 2, which have been described above for achieving the rotational direction independence, are fulfilled.

In the embodiment according to FIG. 13 one can however also recognize that the cooling rib spacing s between two neighboring cooling ribs 8, 10 varies relatively strongly across the radial position. In an exemplary fashion, for two neighboring cooling ribs 8, 10, cooling rib spacings s1 and s2 are identified at different locations. They have a greatly differing absolute value. It has been found that this strong variation of the cooling rib spacing in radial direction is rather disadvantageous for guiding the cooling air flow through the flow channels, formed respectively by the intermediate space between two neighboring ribs, and the cooling performance may therefore be reduced.

Figure 7:
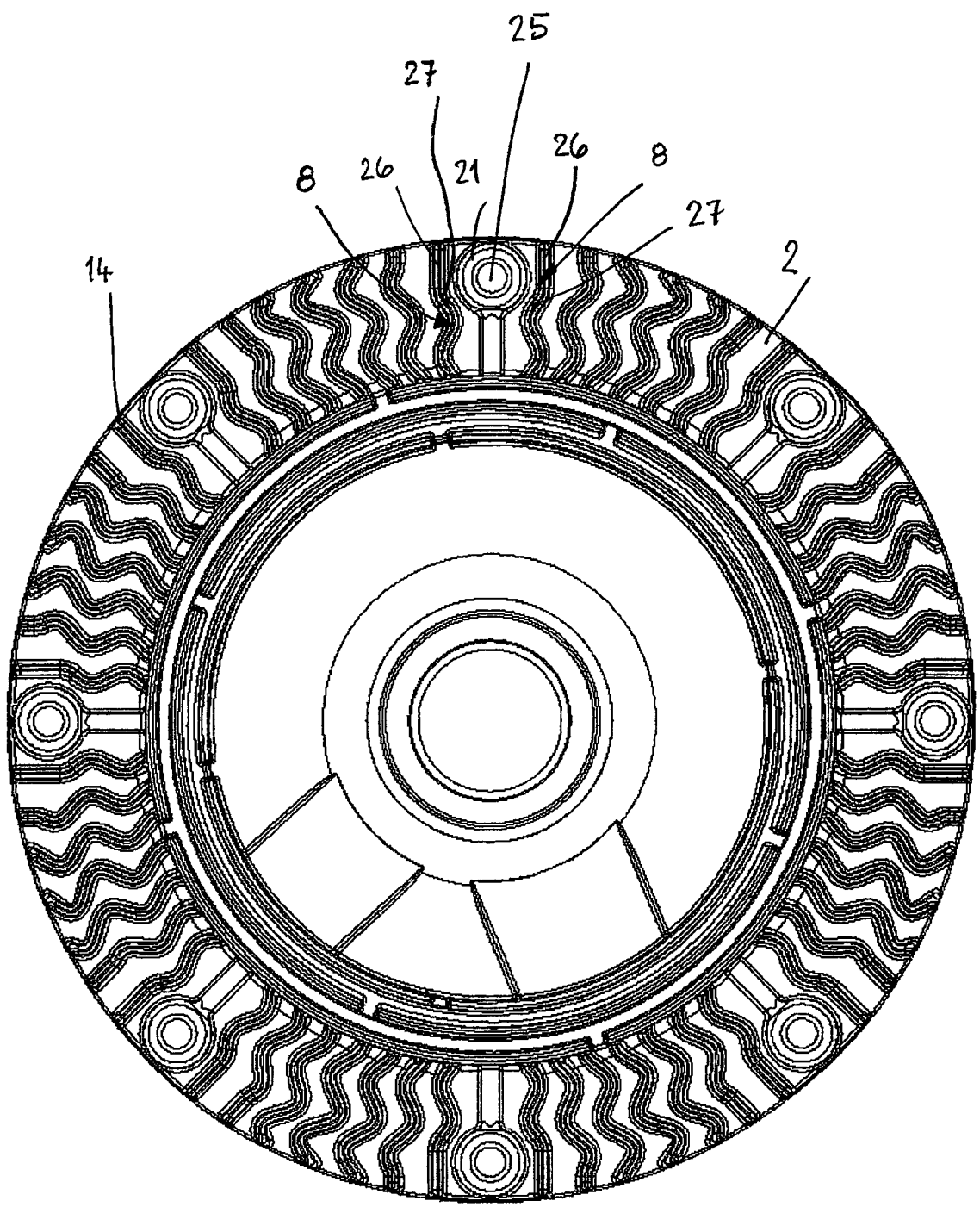
FIG. 7 in axial plan view a stator bushing with a further embodiment of a stator cooling flange of a cooling device according to the invention.

In contrast thereto, in the embodiments according to FIGS. 1, 5, 7, it can be seen that a variation of the phase position ΔΦ between the different cooling ribs 8 of the stator cooling flange 2 is existing in order to fulfill the two criteria for rotational direction independence of the cooling performance but the spacings between respective two neighboring cooling ribs 8 across the radius vary less strongly than in the embodiment according to FIG. 13. In this context, it must be taken into consideration that, based solely on the radial expansion of the inner envelope circle 13 relative to the outer envelope circle 14 of a cooling flange, an enlargement of the cooling rib spacing is to be expected already which in this magnitude alone is not disadvantageous. In order to achieve a radial variation of the cooling rib spacing of neighboring cooling ribs 8, 10 that is not too great, a maximum phase displacement, in regard to absolute value, between two neighboring cooling ribs of ΔΔφ (max)=π/3 has been found to be very advantageous. This condition should advantageously be observed for at least 80% of all possible pairs of directly neighboring cooling ribs 8, 10 of a cooling flange 2, 4, wherein it has no damaging effect when some pairs (max. 20%) of directly neighboring cooling ribs 8, 10 do not fulfill this condition.

In order to obtain even lower rotation sounds in operation of the motor, it can furthermore be advantageous when the cooling ribs 8, 10 are distributed somewhat non-uniformly about the circumference. This non-uniform distribution would be recognizable in particular in a non-uniform distribution of the respective straight reference lines. A ratio between the greatest occurring angular displacement of two neighboring straight reference lines R and the smallest occurring angular displacement of two neighboring straight reference lines R of 1.2 to 2 has been found to be advantageous.

The cooling ribs 8, 10, viewed in axial direction, are advantageously designed without undercut. In this way, it is possible to produce and to remove from the mold the cooling flange 2, 4 with the cooling ribs 8, 10 with a pressure die casting method in a very simple way. In particular, a complete stator bushing according to one of the FIGS. 1 to 8 with stator cooling flange 2 integrated in stator flange 200, bearing bushing 3, wall 6, and cooling ribs 8 can be inexpensively produced by a pressure die casting method.

The embodiment according to FIG. 3 differs from the embodiment according to FIG. 2 in particular in that on the cooling ribs 10 of the rotor cooling flange 4 a flat separating disk 16 is arranged which covers the cooling ribs 10 across most of their radial extension. The annular disk-shaped separating disk 16 is positioned at a spacing opposite to the cooling ribs 8 of the stator cooling flange 2. The radial inner rim 17 of the separating disk 16 has a spacing relative to the annular projection 12. In this way, an air inlet 18 between the annular projection 12 and the inner rim 17 of the separating disk 16 is formed.

The separating disk 16 in the embodiment is provided such that the flat outer side 19 which is facing the cooling ribs 8 of the stator cooling flange 2 is positioned in a common radial plane together with the end face 20 of the annular projection 12. In this way, an optimal flow guiding action for the cooling air is ensured. The separating disk 16 ensures that between the cooling ribs 8 and 10 a guided cooling air flow is generated. The cooling air which is sucked in by the rotating rotor cooling flange 4 flows between the cooling ribs 8 radially from the exterior to the interior in the flow channels 15 and passes from there into the air inlet 18 so that the cooling air subsequently can flow between the cooling ribs 10 of the rotor cooling flange 4 radially from the interior to the exterior.

The annular projection 9 of the stator cooling flange 2 adjoins the annular projection 12 of the rotor cooling flange 4 in such a way that the cooling air at the annular projection 9 is axially deflected such that it passes through the air inlet 18 to the cooling ribs 10. Since the separation disk 16 closes off the flow channels 15 located between the cooling ribs 10 in the direction toward the cooling ribs 8, an excellent air guiding action through the cooling device 205 is ensured.

In other respects, the embodiment according to FIG. 3 is of a comparable configuration to the embodiment according to FIGS. 1 and 2.

Figure 6:
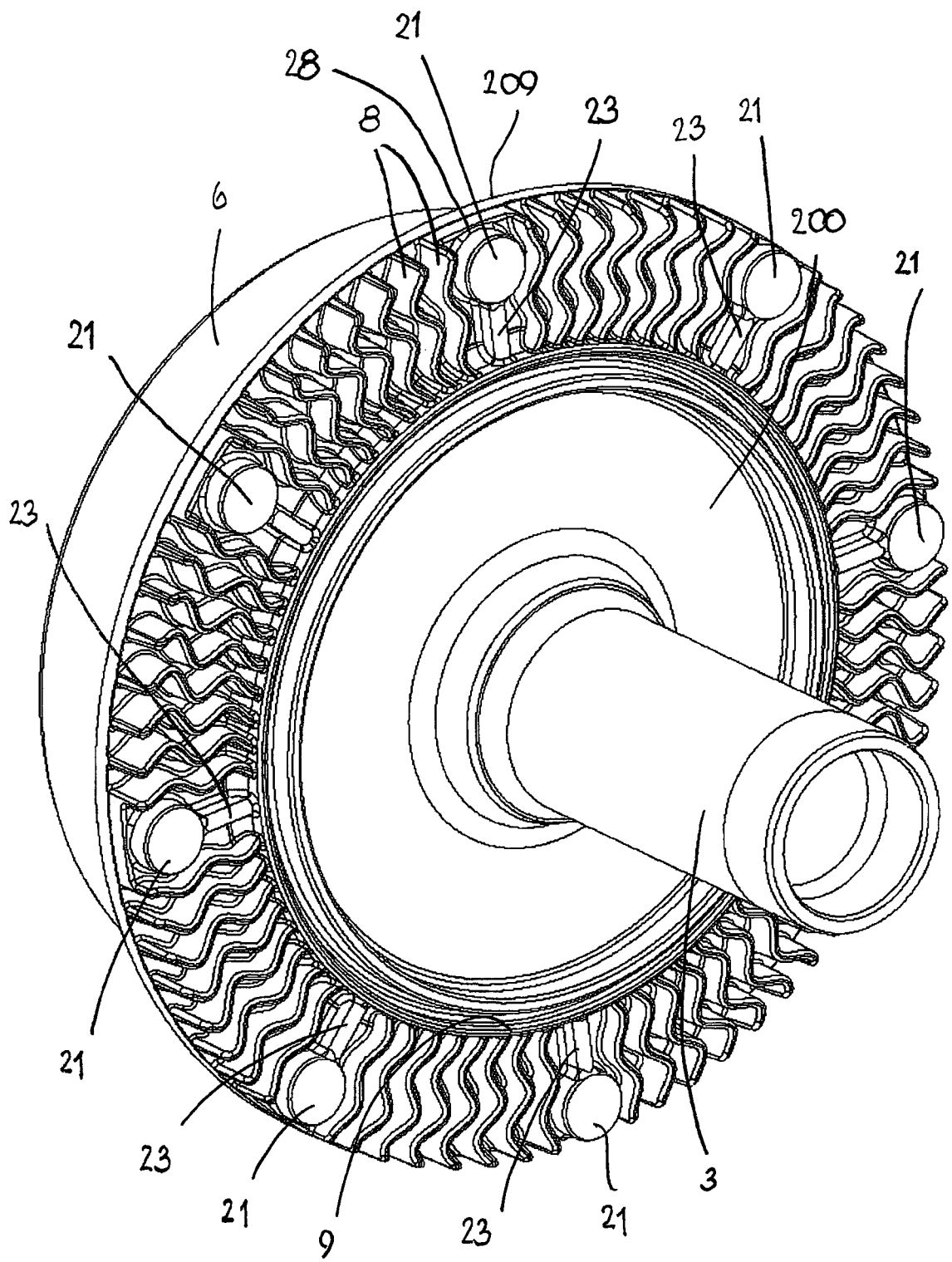
FIG. 6 the stator bushing according to FIG. 5 in perspective illustration.

In the embodiment according to FIGS. 5 and 6, the cooling ribs 8 are longer than in the preceding embodiments. In particular, the radial extension B is relatively large and has a value of approximately 40% of the inner radius Ri of the cooling flange 2. In comparison to the embodiment according to FIG. 1, the ratio of wavelength Λ of the cooling ribs 8 to the radial extension B is smaller and amounts to approximately 60%.

In this embodiment also, neighboring cooling ribs 8 have different phase positions ΔΦ or, expressed dimensionless in radians, Δφ.

In the region between some cooling ribs 8, support sleeves 21 are provided which are integrated at the stator cooling flange 2 and serve for attachment of the stator to a suspension. The latter is fastened to the stator with screws which can be screwed into the support sleeves 21 in a known manner from the side 209 (see FIG. 6) of the stator flange 2 that is facing the wall 6.

In order to utilize the region about the support sleeves 21 optimally with the cooling ribs 8 and flow regions embodied therebetween, the support sleeves 21 are arranged such and the cooling ribs 8 adjacent to the support sleeves 21 shaped such that the undulating sections 22 of the neighboring cooling ribs 8 are matched to the contour shape of the support sleeves 21. Since the support sleeves 21 in the embodiment have a circular cross section, the undulating sections 22 are at least approximately embodied such that they are extending approximately coaxially to the jacket of the support sleeves 21. In this way, a spacing that is required or optimal for the cooling action is ensured between neighboring ribs 8 and the support sleeves 21, i.e., between the support sleeves and the neighboring cooling ribs 8 an effective flow channel 212 (FIG. 5) is formed.

In the embodiment according to FIGS. 5, 6, the rib-averaged amplitude Amr of the individual cooling ribs 8 varies across the circumference. In the region of the support sleeves 21, this average cooling rib amplitude Amr is rather smaller and selected such that between the support sleeves 21 and the respective neighboring rib a beneficial flow channel 212 is formed. For cooling ribs 8 in an intermediate region remote from the support sleeves 21, this average cooling rib amplitude is selected to be rather larger, in particular in order to obtain larger heat-radiating surfaces. The ratio of greatest to smallest average cooling rib amplitude Amr is approximately in the range of 1.2 . . . 2. The ratio of the average cooling rib amplitude Amr of directly neighboring cooling ribs should advantageously not be higher than 1.1 in order to ensure the embodiment of beneficial flow channels.

Also, the phase displacement $\Delta\Delta\Phi$ between the neighboring cooling ribs 8 is designed such that an optimal transition to the neighboring support sleeves 21 is achieved. In this way, despite the support sleeves 21, it is ensured that the cooling action is independent of the rotational direction of the rotor cooling flange 4 (not illustrated).

As a result of the described configuration, the outer sides of the support sleeves 21 in interaction with the undulating sections 22 of the cooling ribs 8 neighboring them also serve for flow guidance and for heat dissipation.

The support sleeves 21 are connected by a radially extending web 23 to the annular projection 9. The webs 23 extend from the base surface of the stator cooling flange 2 approximately in axial direction of the stator cooling flange. Advantageously, the webs 23 have approximately the same height as the support sleeves 21 and the cooling ribs 8.

The support sleeves 21 and the webs 23 are formed without undercut so that removal from the mold of the complete stator bushing 1 is possible without problems.

In contrast to the preceding embodiments, the annular projection 9 is not embodied as a continuous ring but divided by axially extending slots 24 into individual segments. These slots 24 are provided such that they are positioned in the region of the corresponding flow channels 15 between neighboring cooling ribs.

The axial slots 24 are positioned in the region between neighboring support sleeves 21, viewed in axial view (FIG. 5). The support sleeves 21 surround in a known manner openings 25 (FIG. 7) penetrating the stator flange 2 in which advantageously threads are provided into which the screws for connecting the stator to the suspension can be screwed.

The phase position $\Delta\Phi$ varies in the described way about the circumference of the stator flange 2 whereby it is achieved that the cooling action of the cooling ribs 8, 10 is independent of the rotational direction of the rotor cooling flange 4. Since the cooling ribs 8 have the undulation, the rotation sound which occurs in the cooling device 205 in operation of the motor is also significantly reduced in comparison to straight extending cooling ribs at both cooling flanges 2 and 4.

Figure 8:
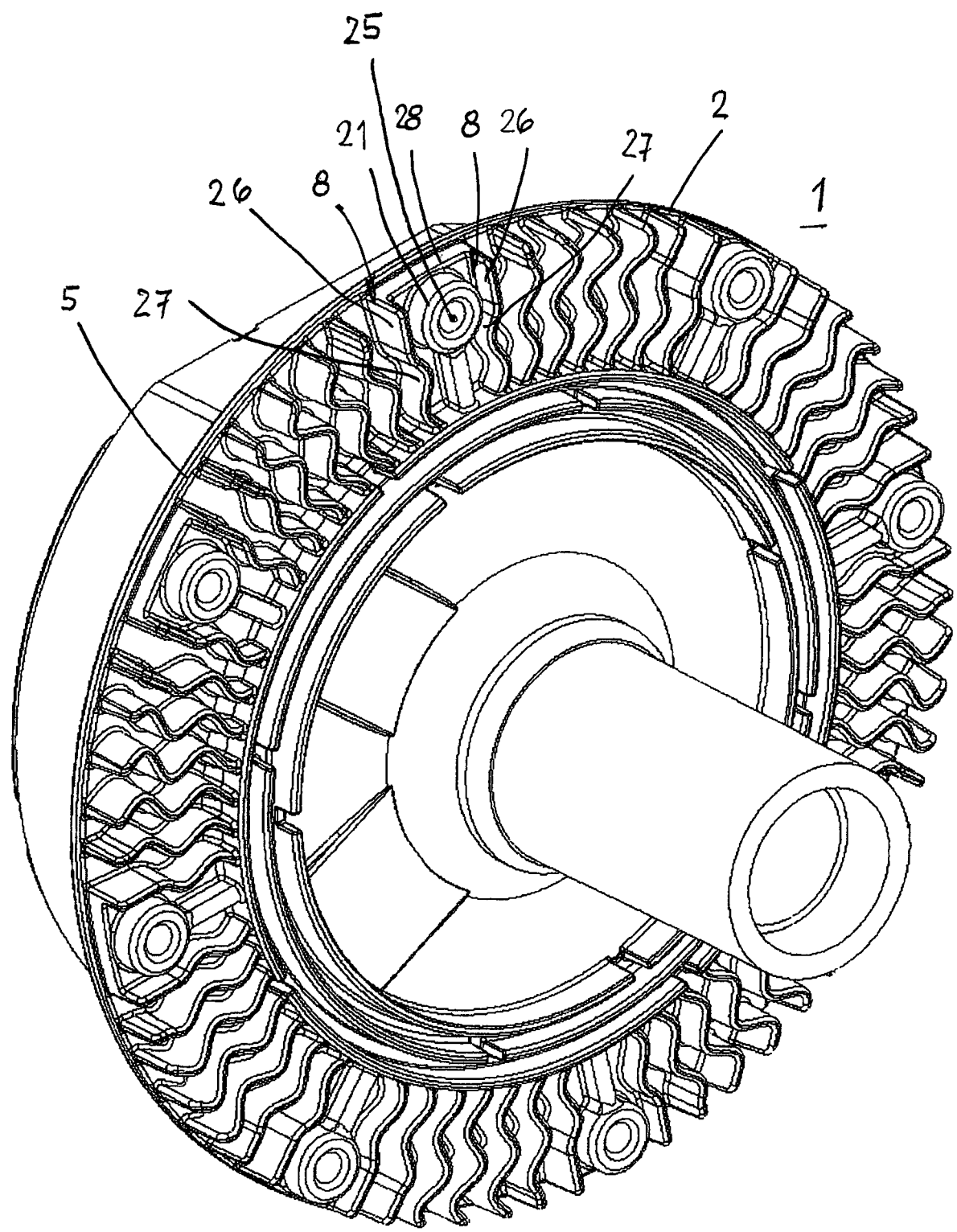
FIG. 8 the stator bushing according to FIG. 7 in perspective illustration.

The FIGS. 7 and 8 show an embodiment which is substantially corresponding to the embodiment according to the FIGS. 5 and 6. Therefore, in the following only the difference in configuration will be described. It resides in that the cooling ribs 8 positioned adjacent to the support sleeves 21 are designed such that no longer the curved undulation sections 22 are coaxial to the support sleeves but that the cooling ribs 8 extend with straight sections 26 parallel to each other adjacent to the support sleeves 21. The straight sections 26 extend from the outer envelope circle 14 radially inwardly such that they reach up to a point close to the support sleeve 21. The straight sections 22 then pass into curved undulation sections 27 which extend approximately coaxial to the respective support sleeves 21. Due to this configuration of the two cooling ribs 8 neighboring the respective support sleeves 21, it is made possible to grip the stator bushing 1 during manufacture with a corresponding gripping device. A corresponding gripping device can engage laterally between the straight and radially aligned cooling rib sections 26.

As is apparent from the embodiments according to FIG. 6 and FIG. 8, in a region 28 between two cooling ribs 8 neighboring the support sleeves 21, the supporting wall of the cooling flange 2 is embodied with greater wall thickness. In this way, the component stresses can be reduced that are occurring due to the suspension being fastened at the support sleeves 21.

The remaining cooling ribs 8 are embodied and arranged in the described way.

In the illustrated embodiment according to FIGS. 7 and 8, there are fifty-six undulating cooling ribs 8 arranged distributed about the circumference of the stator bushing 1. These cooling ribs 8 have advantageously an average thickness of approximately 1.5 to 2.5 mm. Due to the undulating cooling ribs 8 a large heat-dissipating surface is provided without the spacing between neighboring cooling ribs 8 becoming too small. This spacing sm between neighboring cooling ribs, averaged across a cooling flange, amounts at least to the simple average rib thickness dm across the cooling flange. Advantageously, this average spacing sm between neighboring cooling ribs 8 is in a range between two times and six times the average rib thickness dm. In practice, this average spacing sm is advantageously approximately 3 to 18 mm.

When using the motor with axial fan wheels, the outer radius Ra (FIG. 9) is advantageously selected to not be too large because in case of axial fans a cooling flange 2, 4 may represent an obstacle for the air flow of the axial fan. The inner radius Ri in general is determined by the construction of other components of the motor. The ratio of the outer radius Ra to the inner radius Ri of the flange region 29 is advantageously in a range of approximately 1.1 to 1.6, preferably is approximately 1.4. The radial extension B of a cooling flange is determined by Ra and Ri.

As shown in the schematic illustration according to FIG. 9, the undulating cooling rib 8 extends between the outer radius Ra and the inner radius Ri of the cooling flange 2, 4. The outer radius Ra corresponds to the radius of the outer envelope circle 14 and the inner radius Ri to the radius of the inner envelope circle 13 (FIGS. 1 and 7). The cooling rib 8 is arranged in this context such that it is substantially oriented in radial direction. The circumferential direction of the flange region 29 is identified at 0. M identifies the axis of rotation of the rotor.

FIGS. 11a to 11d show different embodiments of the cooling ribs 8, 10 in cross section approximately perpendicular to an imaginary cooling rib center line 8a, 10a.

In the embodiment according to FIG. 11a, the cooling rib 8, 10 has a rectangular cross section with the thickness d. The cooling rib 8, 10 comprises across its height H a corresponding constant cross section or constant thickness d. The ratio H/d is advantageously in a range between approximately 2 and 8. The thickness d amounts advantageously to approximately 1 mm to 4 mm.

The cooling rib 8, 10 according to FIG. 11b has a trapezoidal cross section. In the foot area, the cooling rib 8, 10 has the thickness d1 and in the head area the thickness d2 which is smaller than the thickness d1. The transition from the head side 30 to the sidewalls 31, 32 of the cooling rib 8, 10 is rounded. Due to the trapezoidal cross section, the cooling rib 8, 10 tapers continuously from the foot area to the head area or head side 30, i.e., the thickness d varies from the head area to the foot area. In such a configuration of the cooling rib 8, 10, the ratio H/d is advantageously also in the range between approximately 2 and 8 across the entire height of the cooling ribs 8, 10.

The cooling rib 8, 10 according to FIG. 11c has in principle the same configuration as the cooling rib according to FIG. 11b. The difference resides only in that the head side 30 passes across an edge into the sidewalls 31, 32 and is not rounded.

The slanted sidewalls 31, 32 of the cooling ribs 8, 10 according to the FIGS. 11b and 11c are advantageous for the heat flow because a continuous cross-sectional tapering of the ribs exists in the main flow direction of the heat from the area of the base surface 33 to the head area 30. In particular, however, this cross-sectional configuration has the advantage that the cooling flange 2, 4 can be removed without problems from a casting mold. The sidewalls 31, 32 form drafts.

The cooling rib 8, 10 according to FIG. 11d is characterized in that the head side 30 is not planar as in the embodiments according to FIGS. 11b and 11c but is fully rounded.

In all embodiments according to FIGS. 11a to 11d, the rounded portions can also be provided at the transition from the sidewalls 31, 32 into the base surface 33.

The rounded portions at the end face and the base can also be provided in the cooling rib 8, 10 according to FIG. 11a with the rectangular cross section.

In all described embodiments, the undulating cooling ribs 8, 10 can be provided at only one of the cooling flanges 2, 4, advantageously at a heat-dissipating cooling flange 2, 4. The cooling ribs 8, 10 of the other cooling flange 2, 4 can be embodied straight, as is conventional, wherein these straight cooling ribs 8, 10 can be provided to extend radially but also to extend at an angle to the radial line.

Also, it is possible to provide the undulating cooling ribs not only at one cooling flange 2, 4 but also at both cooling flanges 2, 4. In this context, the undulating cooling ribs 8, 10 of the two cooling flanges 2, 4 can have different characteristic parameters (for example, Ra, Ri, B, Λ, ΔΦ, A).

A cooling flange 2, 4 can be embodied also advantageously with undulating cooling ribs 8, 10 when not all cooling ribs 8, 10 have an undulating shape. Advantageously, at least 50% of all cooling ribs 8, 10 of a cooling flange 2, 4 have an undulating shape, better 80% of all cooling ribs 8, 10 of a cooling flange 2, 4.

What is claimed is:

1. A cooling device of an electric motor, the cooling device comprising:
   a rotor cooling flange (4) and a stator cooling flange (2), wherein the rotor cooling flange (4) is rotatable relative to the stator cooling flange (2);
   wherein at least one of the rotor and stator cooling flanges (2, 4) is provided with cooling ribs (8, 10) that are distributed about a circumference thereof;
   wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
   wherein each of the undulating cooling ribs has a heat-dissipating surface;
   wherein a phase position (Δφ) for at least one pair of the undulating cooling ribs (8, 10) is different;
   wherein an amplitude of additive superposition of the undulation function of all cooling rib center lines (8a, 10a) of the undulating cooling ribs, said amplitude of additive superposition determined by adding all undulation functions and then dividing by the number of the undulating cooling ribs, does not surpass a value of 20% of an average amplitude across all cooling rib center lines (8a, 10a);
   wherein a ratio (Λ/B) of a wavelength (Λ) of the undulating cooling ribs (8, 10) to a radial extension (B) of the heat-dissipating cooling flange (2, 4) assumes a value between 0.7 and 1.7.

2. The cooling device according to claim 1, wherein an average of a sign-affected phase displacement (ΔΔφ) between phase positions (Δφ) of all possible pairs of respective directly neighboring cooling ribs (8, 10) of the at least one of the rotor and stator cooling flanges (2, 4), expressed dimensionless in radians, does not surpass a value of π/6 in absolute value.

3. The cooling device according to claim 1, wherein an average amplitude (Am) of the undulating cooling ribs (8, 10) is in a range of approximately 0.1·Λm to approximately 0.3·Λm, wherein Λm is the average wavelength of all cooling ribs (8, 10) of the heat-dissipating cooling flange (2, 4).

4. The cooling device according to claim 1, wherein an average thickness (dm) of all cooling ribs (8, 10) of the heat-dissipating cooling flange is between approximately 1.5 to approximately 3 mm.

5. The cooling device according to claim 1, wherein an average thickness (dm) of all cooling ribs (8, 10) of one of the at least one of the rotor and stator cooling flanges (2, 4) that is not made of a heat-conducting material so as to be without a heat-dissipating function is between approximately 0.5 to approximately 1.5 mm.

6. The cooling device according to claim 1, wherein opposite ends of the cooling ribs (8, 10) are positioned radially in a region between an inner envelope circle (13) and an outer envelope circle (14).

7. The cooling device according to claim 6, wherein a ratio of a radius (Ra) of the outer envelope circle (14) and a radius (Ri) of the inner envelope circle (13) is between approximately 1.1 and approximately 1.6.

8. The cooling device according to claim 1, wherein the cooling ribs (8, 10) have a constant thickness (d) across a height (H) of the cooling ribs (8, 10).

9. The cooling device according to claim 1, wherein a thickness (d) of the cooling ribs (8, 10) decreases in a direction toward an end face (30) of the cooling ribs (8, 10).

10. An electric motor with a cooling device according to claim 1.

11. The cooling device according to claim 1, wherein an average value of a phase displacement (ΔΔϕ) between the phase positions (Δϕ) of respective directly neighboring cooling ribs (8, 10), expressed dimensionless in radians, does not surpass an absolute value of π/3.

12. A cooling device of an electric motor, the cooling device comprising:
    a rotor cooling flange (4) and a stator cooling flange (2), wherein the rotor cooling flange (4) is rotatable relative to the stator cooling flange (2);
    wherein at least one of the rotor and stator cooling flanges (2, 4) is provided with cooling ribs (8, 10) that are distributed about a circumference thereof;
    wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
    wherein each of the undulating cooling ribs has a heat-dissipating surface;
    wherein a phase position (Δϕ) for at least one pair of the undulating cooling ribs (8, 10) is different;
    wherein an amplitude of additive superposition of the undulation function of all cooling rib center lines (8a, 10a) of the undulating cooling ribs, said amplitude of additive superposition determined by adding all undulation functions and then dividing by the number of the undulating cooling ribs, does not surpass a value of 20% of an average amplitude across all cooling rib center lines (8a, 10a);
    wherein a ratio (sm/dm) of an average spacing (sm) of respective two neighboring cooling ribs (8, 10) to an average thickness (dm) of the cooling ribs (8, 10) assumes a value in a range between 2 and 6.

13. An electric motor with a cooling device according to claim 12.

14. A cooling device of an electric motor, the cooling device comprising:
    a rotor cooling flange (4) and a stator cooling flange (2), wherein the rotor cooling flange (4) is rotatable relative to the stator cooling flange (2);
    wherein at least one of the rotor and stator cooling flanges (2, 4) is provided with cooling ribs (8, 10) that are distributed about a circumference thereof;
    wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
    wherein each of the undulating cooling ribs has a heat-dissipating surface;
    wherein a phase position (Δϕ) for at least one pair of the undulating cooling ribs (8, 10) is different;
    wherein an amplitude of additive superposition of the undulation function of all cooling rib center lines (8a, 10a) of the undulating cooling ribs, said amplitude of additive superposition determined by adding all undulation functions and then dividing by the number of the undulating cooling ribs, does not surpass a value of 20% of an average amplitude across all cooling rib center lines (8a, 10a);
    wherein an average amplitude (Amr) of the cooling ribs (8, 10) varies across the circumference.

15. An electric motor with a cooling device according to claim 14.

16. A cooling device of an electric motor, the cooling device comprising:
    a rotor cooling flange (4) and a stator cooling flange (2), wherein the rotor cooling flange (4) is rotatable relative to the stator cooling flange (2);
    wherein at least one of the rotor and stator cooling flanges (2, 4) is provided with cooling ribs (8, 10) that are distributed about a circumference thereof;
    wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
    wherein each of the undulating cooling ribs has a heat-dissipating surface;
    wherein a phase position (Δϕ) for at least one pair of the undulating cooling ribs (8, 10) is different;
    wherein an average value of a phase displacement (ΔΔϕ) between the phase positions (Δϕ) of respective directly neighboring cooling ribs (8, 10), expressed dimensionless in radians, does not surpass an absolute value of π/3;
    wherein a ratio (Λ/B) of a wavelength (Λ) of the undulating cooling ribs (8, 10) to a radial extension (B) of the heat-dissipating cooling flange (2, 4) assumes a value between 0.7 and 1.7.

17. The cooling device according to claim 16, wherein an average of a sign-affected phase displacement (ΔΔφ) between phase positions (Δφ) of all possible pairs of respective directly neighboring cooling ribs (8, 10) of the at least one of the rotor and stator cooling flanges (2, 4), expressed dimensionless in radians, does not surpass a value of π/6 in absolute value.

18. The cooling device according to claim 16, wherein an average amplitude (Am) of the undulating cooling ribs (8, 10) is in a range of approximately 0.1·Λm to approximately 0.3·Λm, wherein Λm is the average wavelength of all cooling ribs (8, 10) of the heat-dissipating cooling flange (2, 4).

19. The cooling device according to claim 16, wherein an average thickness (dm) of all cooling ribs (8, 10) of the heat-dissipating cooling flange is between approximately 1.5 to approximately 3 mm.

20. The cooling device according to claim 16, wherein an average thickness (dm) of all cooling ribs (8, 10) of one of the at least one of the rotor and stator cooling flanges (2, 4) that is not made of a heat-conducting material so as to be without a heat-dissipating function is between approximately 0.5 to approximately 1.5 mm.

21. The cooling device according to claim 16, wherein opposite ends of the cooling ribs (8, 10) are positioned radially in a region between an inner envelope circle (13) and an outer envelope circle (14).

22. The cooling device according to claim 21, wherein a ratio of a radius (Ra) of the outer envelope circle (14) and a radius (RI) of the inner envelope circle (13) is between approximately 1.1 and approximately 1.6.

23. The cooling device according to claim 16, wherein the cooling ribs (8, 10) have a constant thickness (d) across a height (H) of the cooling ribs (8, 10).

24. The cooling device according to claim 16, wherein a thickness (d) of the cooling ribs (8, 10) decreases in a direction toward an end face (30) of the cooling ribs (8, 10).

25. An electric motor with a cooling device according to claim 16.

26. The cooling device according to claim 16, wherein an amplitude of additive superposition of the undulation function of all cooling rib center lines (8a, 10a) of the undulating cooling ribs, said amplitude of additive superposition determined by adding all undulation functions and then dividing by the number of the undulating cooling ribs, does not surpass a value of 20% of an average amplitude across all cooling rib center lines (8a, 10a).

27. A cooling device of an electric motor, the cooling device comprising:
   a rotor cooling flange (4) and a stator cooling flange (2), wherein the rotor cooling flange (4) is rotatable relative to the stator cooling flange (2);
   wherein at least one of the rotor and stator cooling flanges (2, 4) is provided with cooling ribs (8, 10) that are distributed about a circumference thereof;
   wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
   wherein each of the undulating cooling ribs has a heat-dissipating surface;
   wherein a phase position ($\Delta\phi$) for at least one pair of the undulating cooling ribs (8, 10) is different;
   wherein an average value of a phase displacement ($\Delta\Delta\phi$) between the phase positions ($\Delta\phi$) of respective directly neighboring cooling ribs (8, 10), expressed dimensionless in radians, does not surpass an absolute value of $\pi/3$;
   wherein a ratio (sm/dm) of an average spacing (sm) of respective two neighboring cooling ribs (8, 10) to an average thickness (dm) of the cooling ribs (8, 10) assumes a value in a range between 2 and 6.

28. An electric motor with a cooling device according to claim 27.

29. A cooling device of an electric motor, the cooling device comprising:
   a rotor cooling flange (4) and a stator cooling flange (2), wherein the rotor cooling flange (4) is rotatable relative to the stator cooling flange (2);
   wherein at least one of the rotor and stator cooling flanges (2, 4) is provided with cooling ribs (8, 10) that are distributed about a circumference thereof;
   wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
   wherein each of the undulating cooling ribs has a heat-dissipating surface;
   wherein a phase position (AO) for at least one pair of the undulating cooling ribs (8, 10) is different;
   wherein an average value of a phase displacement ($\Delta\Delta\phi$) between the phase positions ($\Delta\phi$) of respective directly neighboring cooling ribs (8, 10), expressed dimensionless in radians, does not surpass an absolute value of $\pi/3$;
   wherein an average amplitude (Amr) of the cooling ribs (8, 10) varies across the circumference.

30. An electric motor with a cooling device according to claim 29.

31. A cooling device of an electric motor, the cooling device comprising:
   a rotor cooling flange (4) and a stator cooling flange (2), wherein the rotor cooling flange (4) is rotatable relative to the stator cooling flange (2);
   wherein at least one of the rotor and stator cooling flanges (2, 4) is provided with cooling ribs (8, 10) that are distributed about a circumference thereof;
   wherein at least one of the rotor and stator cooling flanges (2, 4) is a heat-dissipating cooling flange configured to dissipate heat to ambient air in operation of the electric motor, wherein the cooling ribs (8, 10) of the heat-dissipating cooling flange (2, 4) include undulating cooling ribs having across a length thereof an undulating course;
   wherein each of the undulating cooling ribs has a heat-dissipating surface;
   wherein a phase position ($\Delta\phi$) for at least one pair of the undulating cooling ribs (8, 10) is different;
   wherein an amplitude of additive superposition of the undulation function of all cooling rib center lines (8a, 10a) of the undulating cooling ribs, said amplitude of additive superposition determined by adding all undulation functions and then dividing by the number of the undulating cooling ribs, does not surpass a value of 20% of an average amplitude across all cooling rib center lines (8a, 10a);
   wherein an average value of a phase displacement ($\Delta\Delta\phi$) between the phase positions ($\Delta\phi$) of respective directly neighboring cooling ribs (8, 10), expressed dimensionless in radians, does not surpass an absolute value of $\pi/3$.

32. An electric motor with a cooling device according to claim 31.

* * * * *